US012117580B2

(12) United States Patent
Yang et al.

(10) Patent No.: US 12,117,580 B2
(45) Date of Patent: Oct. 15, 2024

(54) EVALUATION OF ROCK PHYSICAL PROPERTIES FROM DRILL SOUNDS THROUGH MINIMIZING THE EFFECT OF THE DRILL BIT ROTATION

(71) Applicant: Saudi Arabian Oil Company, Dhahran (SA)

(72) Inventors: Yunlai Yang, Dhahran (SA); Wei Li, Beijing (CN); Maher I. Almarhoon, Qatif (SA); Fahd A. Almalki, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 254 days.

(21) Appl. No.: 16/902,622

(22) Filed: Jun. 16, 2020

(65) Prior Publication Data

US 2021/0389492 A1 Dec. 16, 2021

(51) Int. Cl.
*G01V 1/50* (2006.01)
*E21B 49/00* (2006.01)
(Continued)

(52) U.S. Cl.
CPC .............. *G01V 1/50* (2013.01); *E21B 49/003* (2013.01); *G01V 1/46* (2013.01); *G06F 17/142* (2013.01);
(Continued)

(58) Field of Classification Search
CPC . G01V 1/50; G01V 1/46; G01V 1/306; G01V 2210/3246; G01V 2210/3248; G01V 2210/1216; E21B 49/003; G06F 17/142
See application file for complete search history.

(56) References Cited

U.S. PATENT DOCUMENTS 4,958,125 A * 9/1990 Jardine ..................... G01P 3/44
73/152.59
6,088,294 A * 7/2000 Leggett, III ............ E21B 44/00
175/45
(Continued)

FOREIGN PATENT DOCUMENTS

WO WO-2021046335 A1 * 3/2021

OTHER PUBLICATIONS

Bayless and et al, Acoustic Noise Reduction of Switched Reluctance Motor With Reduced RMS Current and Enhanced Efficiency (Year: 2016).*

(Continued)

*Primary Examiner* — Douglas Kay
(74) *Attorney, Agent, or Firm* — Fish & Richardson P.C.

(57) ABSTRACT

Systems and methods include a computer implemented method for evaluating rock physical properties. Drilling acoustic signals are received in real time during a drilling operation through rock at a drilling location. Transformed data is generated in a frequency domain from the drilling acoustic signals. The transformed data includes frequency and amplitude information for the drilling acoustic signals. De-noised transformed data is generated from the transformed data by filtering noise including background noise generated in a recording system and top drive rotation generated traces. A lithological significant frequency range that includes de-noised significant data points is determined from the de-noised transformed data. Physical properties of the rock are determined in real time using drill bit rotation rates and the amplitudes of the de-noised significant data points.

19 Claims, 15 Drawing Sheets

(51) Int. Cl.
*G01V 1/46* (2006.01)
*G06F 17/14* (2006.01)

(52) U.S. Cl.
CPC ............... *G01V 2210/3246* (2013.01); *G01V 2210/3248* (2013.01)

(56) References Cited

U.S. PATENT DOCUMENTS

| | | | | |
|---|---|---|---|---|
| 6,424,919 | B1* | 7/2002 | Moran | E21B 44/00 |
| | | | | 702/6 |
| 7,026,950 | B2* | 4/2006 | Guggari | E21B 47/18 |
| | | | | 175/42 |
| 9,234,974 | B2 | 1/2016 | Yang | |
| 9,447,681 | B2 | 9/2016 | Yang | |
| 9,684,087 | B2* | 6/2017 | Yang | G01N 29/32 |
| 9,696,444 | B2* | 7/2017 | Yang | G10L 21/0208 |
| 9,903,974 | B2 | 2/2018 | Yang | |
| 2004/0217879 | A1* | 11/2004 | Guggari | E21B 47/12 |
| | | | | 340/853.3 |
| 2008/0068211 | A1* | 3/2008 | Aiello | E21B 47/13 |
| | | | | 340/854.6 |
| 2010/0284247 | A1* | 11/2010 | Manning | G01V 1/306 |
| | | | | 367/28 |
| 2013/0075157 | A1* | 3/2013 | Yang | E21B 47/107 |
| | | | | 175/40 |
| 2013/0075159 | A1* | 3/2013 | Yang | E21B 49/00 |
| | | | | 175/50 |
| 2013/0080060 | A1* | 3/2013 | Yang | G01V 1/50 |
| | | | | 702/9 |
| 2013/0080065 | A1* | 3/2013 | Yang | G01V 1/50 |
| | | | | 175/50 |
| 2013/0118808 | A1* | 5/2013 | Yang | E21B 7/06 |
| | | | | 175/24 |
| 2015/0071035 | A1* | 3/2015 | Yang | G01N 29/32 |
| | | | | 367/25 |
| 2015/0071036 | A1* | 3/2015 | Yang | G01N 29/32 |
| | | | | 367/25 |
| 2017/0067337 | A1* | 3/2017 | Havens | E21B 43/26 |
| 2017/0153343 | A1 | 6/2017 | Almarhoon et al. | |
| 2018/0171772 | A1* | 6/2018 | Rodney | E21B 49/003 |
| 2018/0293309 | A1* | 10/2018 | Echols | G06F 16/683 |
| 2019/0072685 | A1* | 3/2019 | Yang | G01V 1/50 |
| 2020/0056470 | A1* | 2/2020 | Ng | E21B 19/06 |

OTHER PUBLICATIONS

Schneider, David M., Janani Sundararajan, and Richard Mooney. "A cortical filter that learns to suppress the acoustic consequences of movement." Nature 561, No. 7723 (2018): 391-395 (Year: 2018).*

(Plummer, Andrew R., and N. D. Vaughan. "Robust adaptive control for hydraulic servosystems." (1996): 237-244 (Year: 1996).*

PCT International Search Report and Written Opinion in International Appln. No. PCT/US2021/036846, dated Sep. 16, 2021, 12 pages.

Macpherson et al., "Measurement of Mud Motor Rotation Rates using Drilling Dynamics," presented at the SPE/IADC Drilling Conference, Amsterdam, The Netherlands, Feb. 27-Mar. 1, 2001, 10 pages.

* cited by examiner

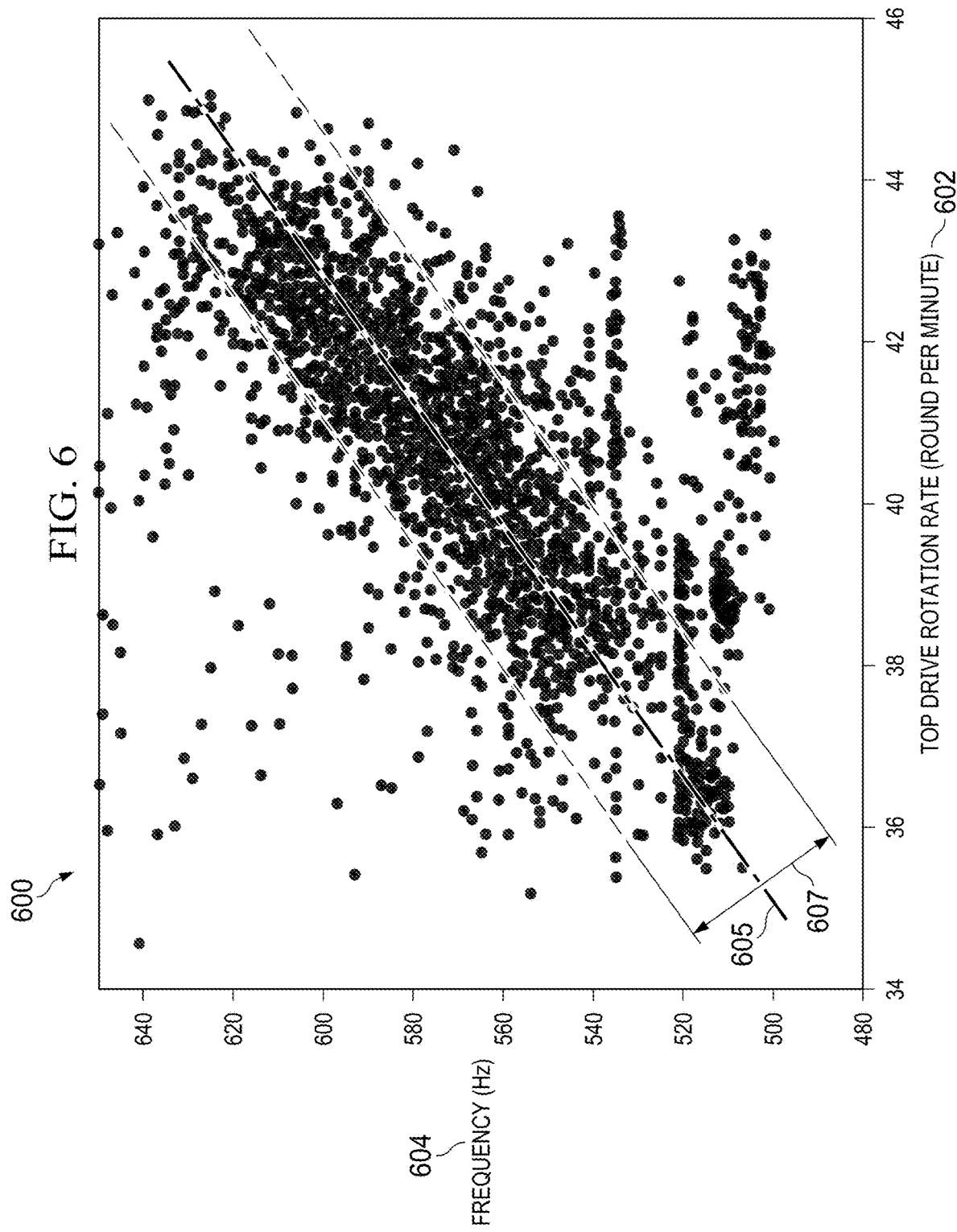

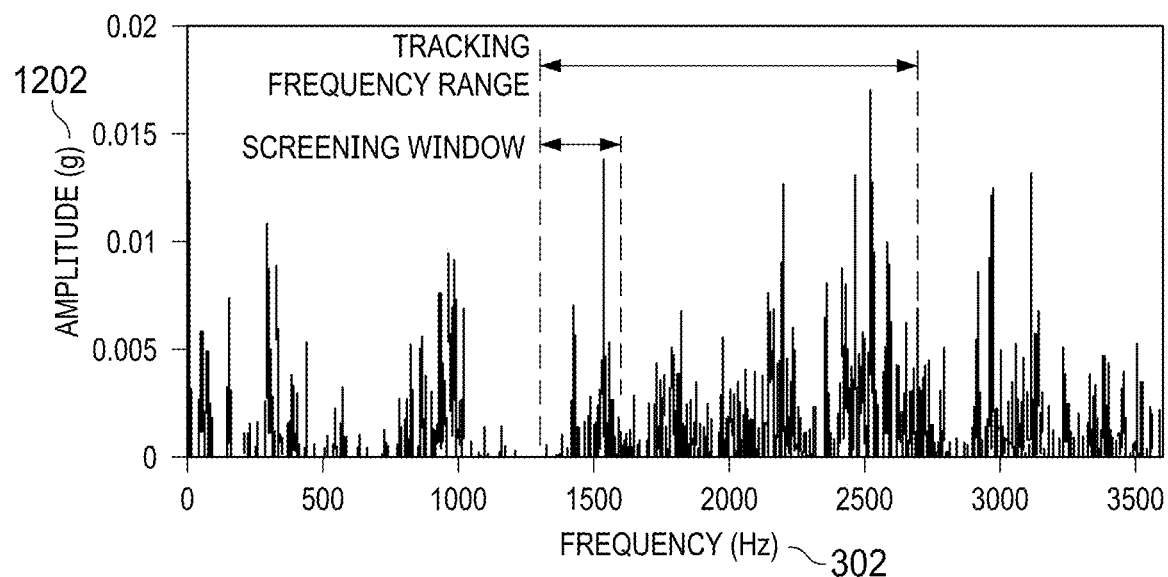
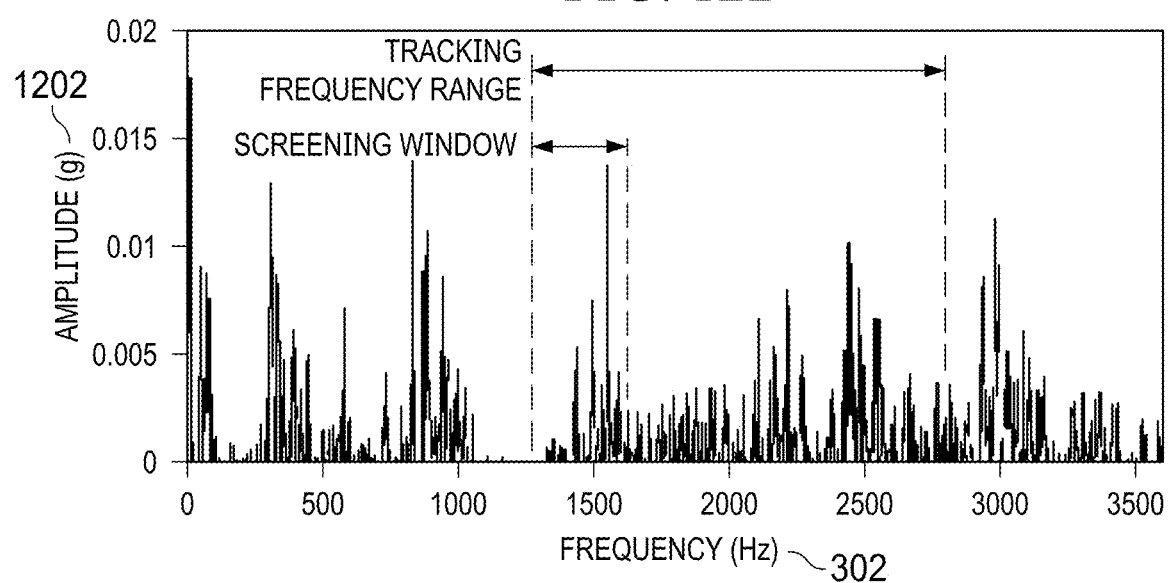

EVALUATION OF ROCK PHYSICAL PROPERTIES FROM DRILL SOUNDS THROUGH MINIMIZING THE EFFECT OF THE DRILL BIT ROTATION

BACKGROUND

The present disclosure applies to hydrocarbon production, and more particularly, to identifying rock types and rock properties in order to improve or enhance drilling operations.

Measuring rock properties during drilling in real time can provide an operator with the ability to steer a drill bit in the direction of desired hydrocarbon concentrations. The operator can also precisely position casing shoe by knowing rock boundaries. In conventional systems, resistivity or sonic logging while drilling (LWD) tools are employed to guide a drill bit during horizontal or lateral drilling. These techniques typically rely on calculating the location of the boundary between the pay zone and the overlying rock (or upper boundary), and the location of the boundary between the pay zone and underlying rock at the sensors' locations. The drill bit is typically steered or maintained within the pay zone by keeping the drill string, at the sensors' position, in the middle, or at a certain position between the upper and lower boundaries of the pay zone. Since the sensors are typically located 30-50 feet behind the drill bit, conventional LWD steering tools typically only provide data used in steering the drill bit 30-50 feet behind the drill bit. As the result, it is only after the 30-50 feet that the operator learns that the selected drilling path is (or is not) in the desired location. The delayed information also makes precise positioning of a casing shoe difficult. Therefore, these tools are not true real-time tools.

Some newer types of systems attempt to provide data at the drill bit, in real-time during drilling, from drill sounds resulting from the drill bit engaging rock during drilling operations. Drill sounds can be recorded by using acoustic sensors attached to either drive shaft extensions of a drill rig on surface, or a downhole sub-assembly adjacent to the drill bit of a drill rig. Unlike a normal well log, such as a sonic log or a gamma ray log which provide simple curves, the drill sounds are very rich and complex. Moreover, drill sounds are typically heavily affected by the rotation rate of the drill bit.

SUMMARY

The present disclosure describes techniques that can be used for evaluating rock physical properties from drill sounds, where the effect of the drill bit rotation rate is minimized. In some implementations, a computer-implemented method includes the following. Drilling acoustic signals are received in real time during a drilling operation through rock at a drilling location. Transformed data is generated in a frequency domain from the drilling acoustic signals. The transformed data includes frequency and amplitude information for the drilling acoustic signals. De-noised transformed data is generated from the transformed data by filtering noise including background noise generated in a recording system and top drive rotation generated traces. A lithological significant frequency range that includes de-noised significant data points is determined from the de-noised transformed data. Physical properties of the rock are determined in real time using drill bit rotation rates and the amplitudes of the de-noised significant data points.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, sample-specific background noise can be removed by an automatically tuned sample-specific dynamic filter. Second, rock physical properties can be evaluated from drill sounds. Third, the effects the drill bit rotation rates can be minimized to derive rock physical properties from the rich and complex drill sounds.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 6 is a graph showing an example of a plot showing a dependence of the frequency of a trace on the rotation rate of the top drive, according to some implementations of the present disclosure.

FIGS. 12A and 12B are graphs showing example of plots tracking frequency range, screening window, and screening range on a current sample and a sample-in-process, according to some implementations of the present disclosure.

Like reference numbers and designations in the various drawings indicate like elements.

DETAILED DESCRIPTION

The following detailed description describes techniques for evaluating rock physical properties from drill sounds, where the effect of the drill bit rotation rate is minimized. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

This present disclosure describes techniques for the evaluation of rock physical properties from drill sounds (which are generated from a drill bit engaging rock during drilling operations). The evaluation can include minimizing the effect of top drive and drill bit rotation on the drill sounds, for example. The recorded drill sounds can be filtered to remove recording system background noise, and then cleaned to remove the noise generated by top drive rotation. Mathematical models can be constructed between the cleaned drill sounds, drill bit rotation rate, and rock physical properties. Physical properties can include, for example, lithology type and the presence of hydrocarbons. The mathematical models can be constructed using at least two techniques, for example, depending on the way that the effect of the drill bit rotation is processed in the model construction. In a first technique, the drill bit rotation rate can be used as an input in the model construction. In the second technique, the effect of the drill bit rotation rate on the amplitude of drill sounds can be established. The effect can be minimized at the data point level by normalizing the amplitude by the drill bit rotation. The normalized drill sounds can be used as inputs in model construction. The constructed models can be applied to derive rock physical properties from drill sounds.

Drill sounds can be available all the time during drilling and are real-time in nature. A tool can be used to record and process drill sounds in real time. For example, the term real-time can correspond to events that occur within a specified period of time, such as within a few seconds. Techniques can be used to derive lithological information from the recorded drill sounds.

Figure 1:
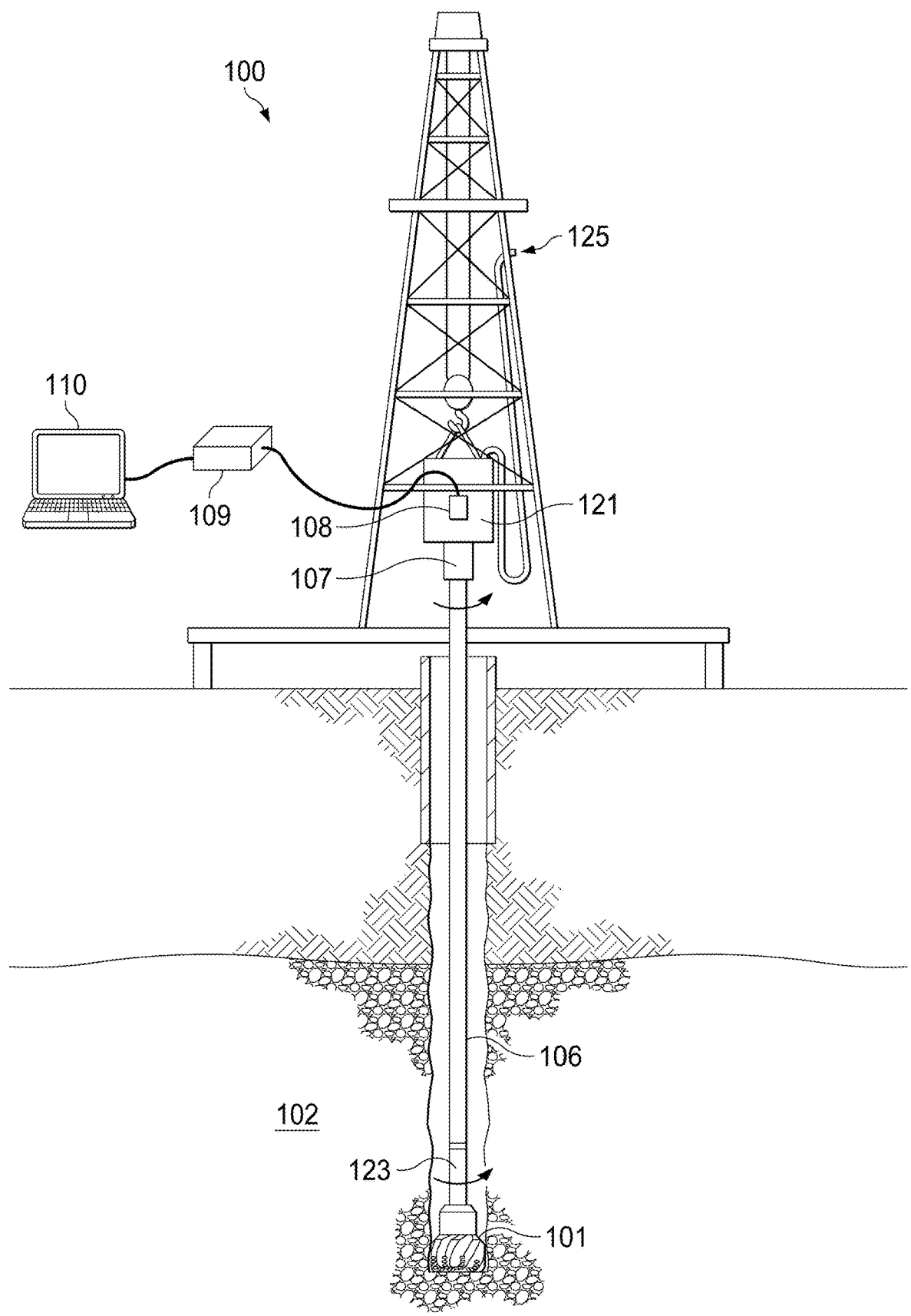
FIG. 1 is schematic diagram showing examples of drill sound generation recording and the rotation of the drill bit of a drill rig, according to some implementations of the present disclosure.

FIG. 1 is schematic diagram showing examples of drill sound generation, recording and the rotation of the drill bit of a drill rig, according to some implementations of the present disclosure. An oil or gas well can be drilled by a drill bit 101 of a drill rig 100, cutting into the rock beneath. The cutting can be conducted through the rotation of the drill bit 101. Generally, the rotation of the drill bit 101 of a drill rig 100 can be driven by a top drive 121 through a drive shaft 107 and a drill string 106. If a mud motor 123 is used to aid directional drilling, then the drill bit 101 can also be rotated by the mud motor 123 (which is driven by the injected drilling mud 125). As a result, the drill bit rotation rate can be the summation of the rotation rate of the top drive and the rotation rate of the mud motor. In a special drilling mode called a "sliding mode," the drill bit 101 is only rotated by the mud motor 123.

When drilling into different lithologies, or when drilling into the same lithology with different properties (for example, porosity, water saturation, permeability, and presence of fractures) with a drill rig 100, the generated drill sounds emanating from the drill bit 101 and the contacted rock 102 are distinctly different. The drill sounds transmit upward along the drill string 106. According to conventional knowledge, the drill sounds can be picked up by one or more acoustic sensors 108 attached directly to the drive shaft 107 (or attached to an extension of the drive shaft of a drill rig on surface). The drill sounds can also be picked up by a downhole subassembly (not shown in FIG. 1) adjacent to the drill bit. The drill sounds that are picked up by the sensors can be digitized by a data acquisition unit 109. The digitized data can then be transmitted to a computer 110 to be recorded. The recorded drill sounds are termed as drilling acoustic signals hereafter.

Figure 2A:
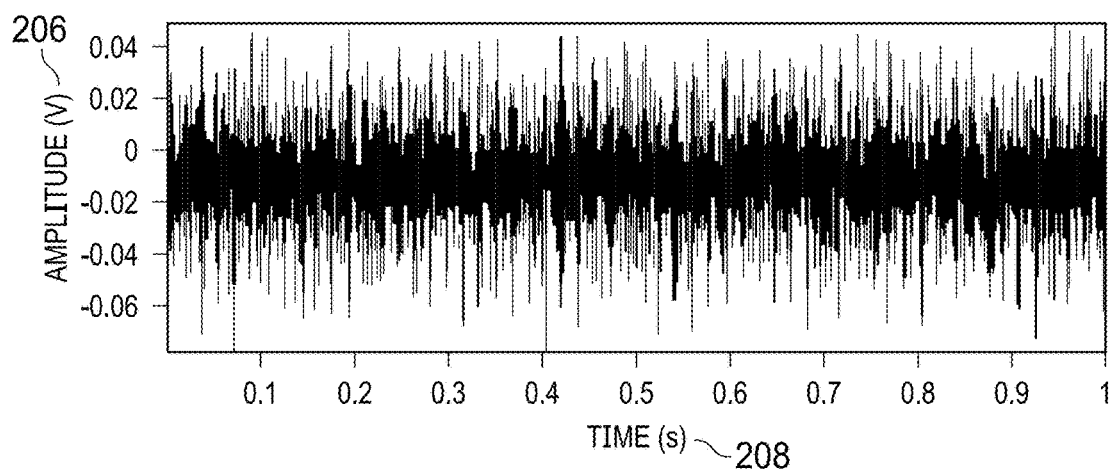
FIGS. 2A-2C are graphs showing examples of recorded drilling acoustic signal data, according to some implementations of the present disclosure.
Figure 2B:
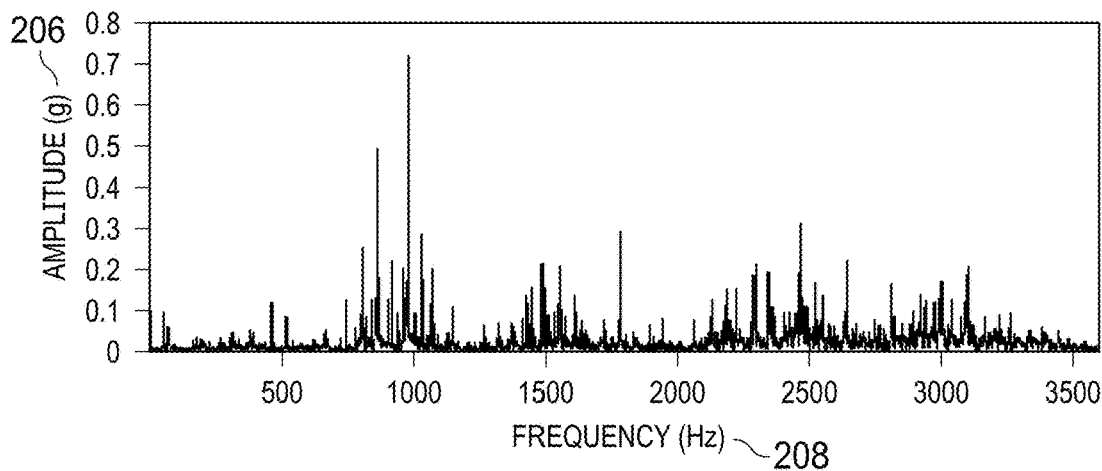
Figure 2C:
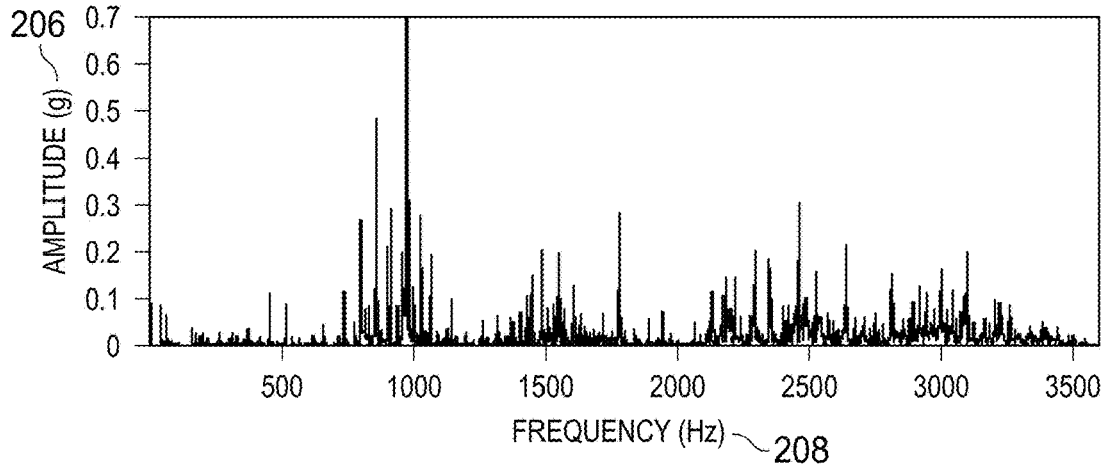

FIGS. 2A-2C are graphs showing examples of recorded drilling acoustic signal data, according to some implementations of the present disclosure. The drilling acoustic signals can be recorded in time domain 201 along a time axis 204. The signals can be transformed by using, for example, a Fast Fourier Transformation (FFT) into frequency domain data 202 (or simply called FFT data 202) for analysis. The FFT data 202 includes the frequency and amplitude information of a sampled acoustic signal, according to an amplitude axis 206 and a frequency axis 208, for example, in Hertz (Hz).

The FFT data 202 can be plotted relative to a drilling depth. An example of such a signal is displayed in diagram 301 shown in FIG. 3, plotted relative to frequency axis 302 and depth 304.

Figure 3:
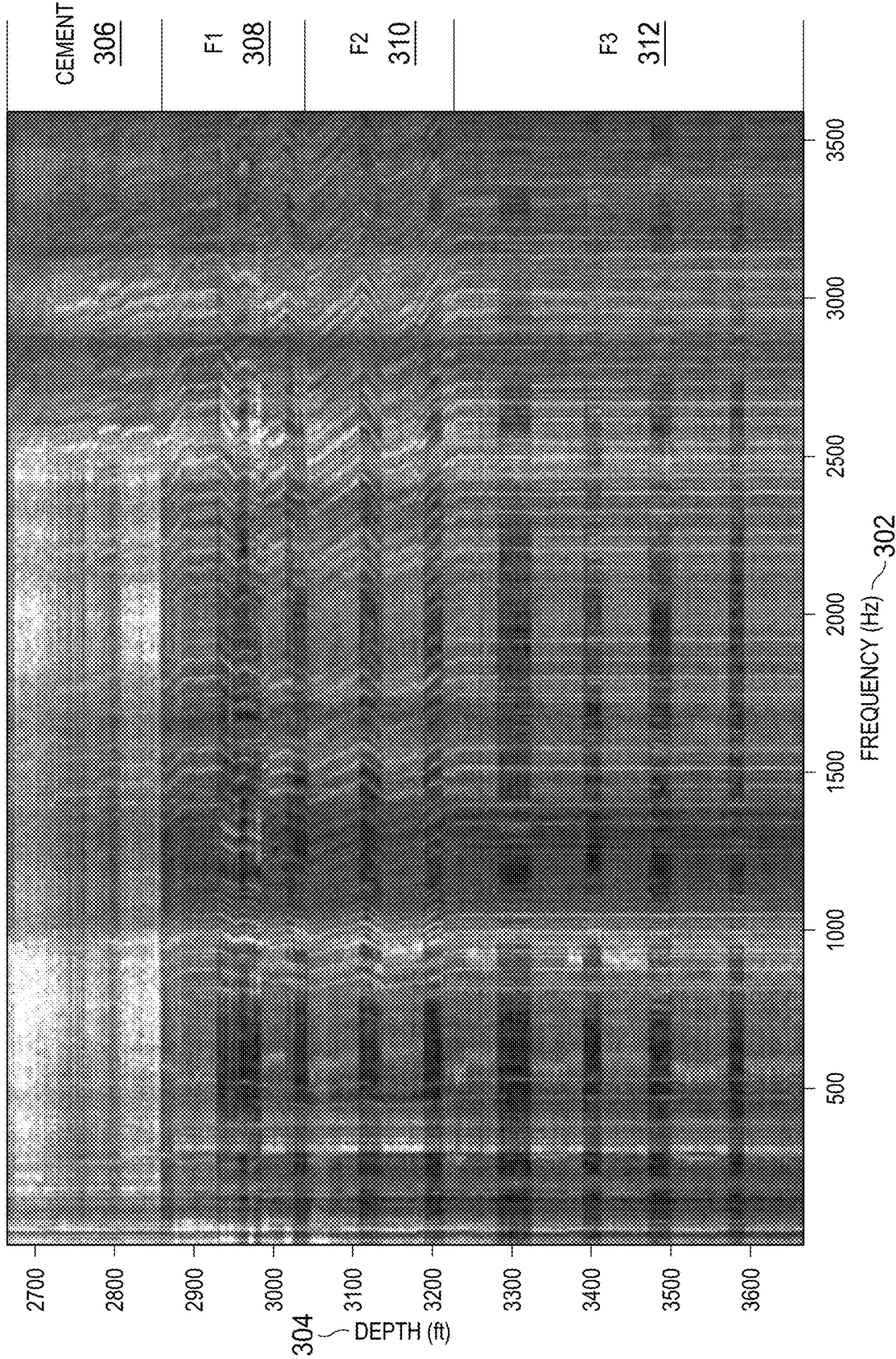
FIG. 3 is a graph showing an example of a drilling acoustic signal data in the diagram 301, according to some implementations of the present disclosure.

FIG. 3 is a graph showing an example of a drilling acoustic signal data in a diagram 301, according to some implementations of the present disclosure. The diagram 301 was recorded on an oil well drill rig during a drilling operation. Referring to diagram 301, each line at a depth is a sample corresponding to FFT data 202. The amplitude of a sample on diagram 301 is represented by a darkness scheme, with lightest colors corresponding to greatest amplitudes and darkest colors corresponding to lesser amplitudes.

The drilling acoustic signals 301 in FIG. 3 were recorded in a cement section 306 (resulted from casing installation) and in three rock formations underneath it. The drilling acoustic signals in the cement section 306 are very different from that in the three rock formations underneath it, reflecting the effect of the material type. Formation 1 (F1) 308 is composed of limestone and clastic sedimentary rocks. Formation 2 (F2) 310 and Formation 3 (F3) 312 have a similar lithology type of limestone, but with different physical properties, such as porosity and strength. FIG. 3 shows, in these three rock formations, drilling acoustic signal data in FFT format are different, a reflection of the effects of lithology type and properties.

Data Preprocessing

Data preprocessing can be used to generate standard, noise-compressed inputs for both mathematical models construction and models application for evaluation of rock physical properties. In some implementations, two stages can be used in data preprocessing. In a first stage, general techniques can be applied. In a second stage, techniques developed specifically for the present disclosure can be applied. The two stages are termed "Initial Data Preprocess" and "Deep Data Preprocess" respectively.

Initial Data Preprocess

Recorded drilling acoustic signals include noise. The background noise generated in a recording system should be filtered. In some implementations, filtering of the background noise can be done using existing or a new dynamic threshold filtering techniques. The background noise may vary during recording, including from sample to sample. Using the Dynamic Threshold Filtering Method can remove sample-specific background noise by an automatically-tuned, sample-specific dynamic filter. In FIG. 2, the FFT data 202, after applying the Dynamic Threshold Filtering Method becomes a much cleaner, as filtered FFT data 203.

Figure 4:
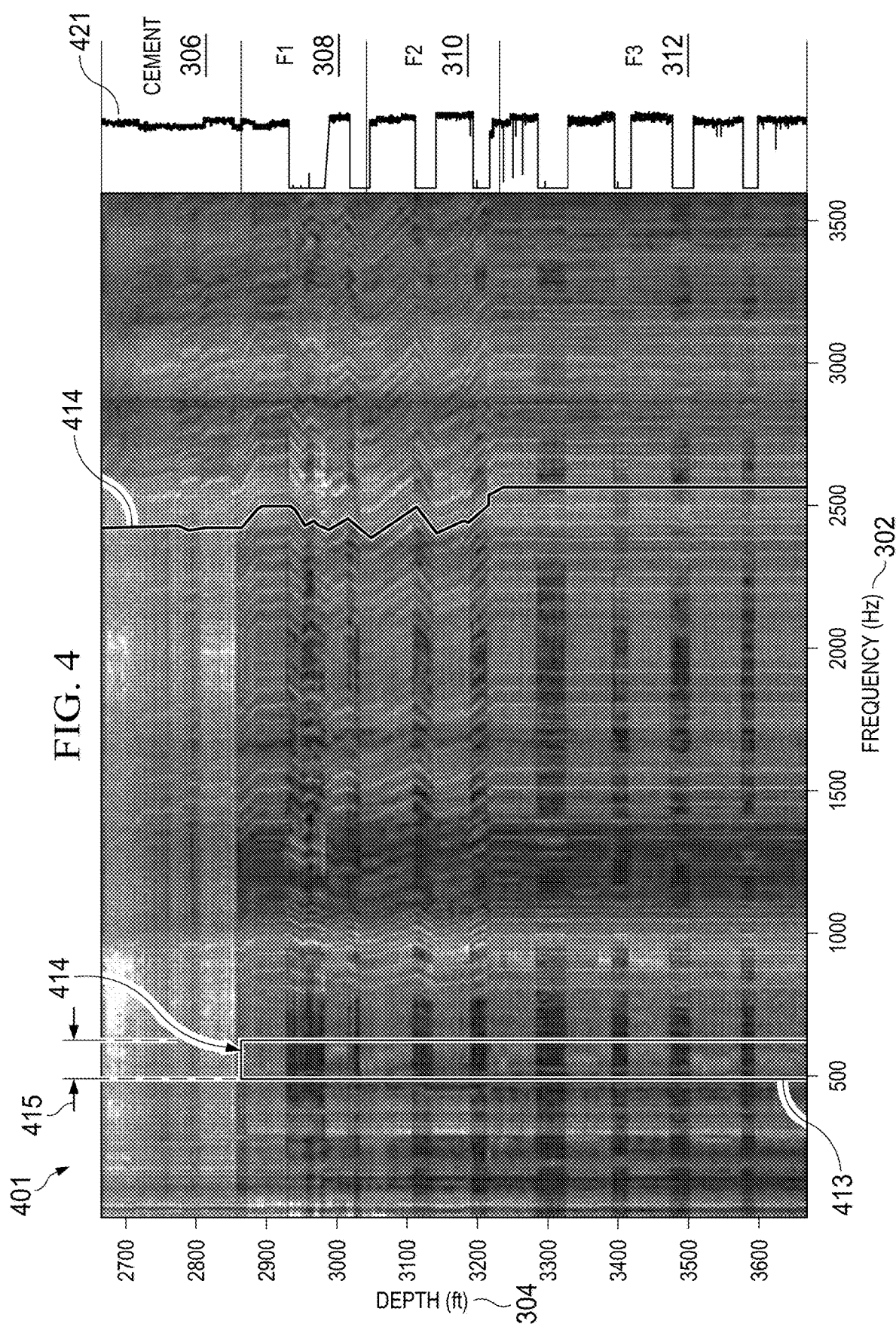
FIG. 4 is a graph showing an example of filtered Fast Fourier Transformation (FFT) data after applying the Dynamic Threshold Filtering Method to the raw FFT data in FIG. 3, according to some implementations of the present disclosure.

FIG. 4 is a graph showing an example of filtered FFT data after applying the Dynamic Threshold Filtering Method to the raw FFT data 301 in FIG. 3, according to some implementations of the present disclosure. The top drive rotation rate 421 is plotted alongside the graph. After applying the filtering method to the whole record 301 shown in FIG. 3, a filtered record 401 is produced. Comparing the raw FFT 301 with the filtered one 401, it is clear that the filtered one becomes much cleaner.

Figure 5:
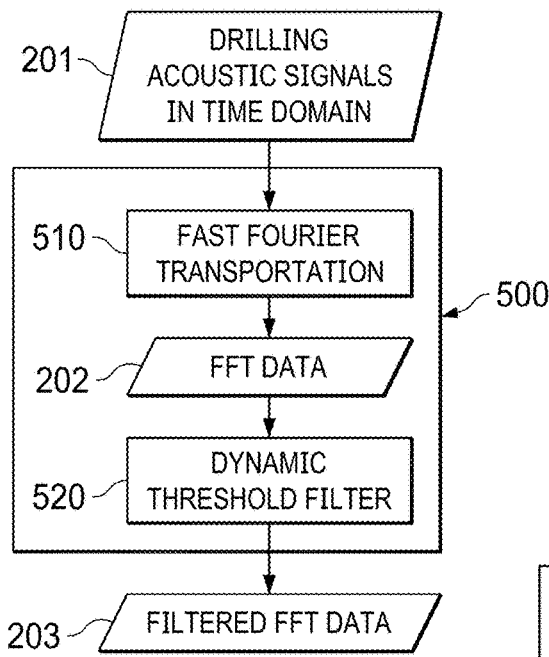
FIG. 5 is a flow diagram showing an example of a workflow outlining steps for initial data preprocessing to produce filtered FFT data, according to some implementations of the present disclosure.

FIG. 5 is a flow diagram showing an example of a workflow outlining steps for initial data preprocessing to produce filtered FFT data, according to some implementations of the present disclosure. Specifically, filtered FFT data can be produced from raw drilling acoustic signal data (in a time domain) by applying FFT and the Dynamic Threshold Filtering Method.

This process is summarized in an initial data preprocess module 500 (FIG. 5). First, the drilling acoustic signals in time domain 201 can be transformed by using a FFT 510 to generate FFT data 202. Second, the FFT data 202 can be filtered by applying a dynamic threshold filter 520 to produce filtered FFT data 203. The filtered FFT data 203 can be used in both model construction and applications.

Deep Data Preprocess

When filtered FFT data 203 is plotted together along depth to form a filtered FFT record 401, the data points of the filtered FFT data 203 form traces. Trace 411 (FIG. 4) is an example of traces.

Investigation can determine that some traces are created by top drive rotation, and the amplitude of most traces is affected by drill bit rotation rate. To maximally extract lithological information from drilling acoustic signal data, the effect of top drive rotation and drill bit rotation should be minimized. Therefore the rotation rate of the top drive and the drill bit are required to be considered when processing the data.

The rotation rate of a top drive is typically recorded during a drilling operation by the operator. Since the rotation of a drill bit is the summation of the top drive rotation and the mud motor rotation, the mud motor rotation rate is required. The rotation rate of a mud motor 123 (FIG. 1) can be measured in various ways or derived from the mud flow rate. The mud flow rate can be recorded during drilling, and can be represented using following formula of Equation (1):

$$R_m = C_m \times Q_m \tag{1}$$

where, $R_m$ is the mud motor rotation rate (for example, in rounds per minute), $C_m$ is a mud motor performance parameter (constant for a given mud motor, measured in, for example, revolutions per gallon), and $Q_m$ is a drilling mud flow rate (for example, in gallons per minute).

The well section along which the example drilling acoustic signals 301 (FIG. 3) were recorded was drilled with the aid of a mud motor. To show the effect of the top drive and drill bit rotation, the rotation rate 421 of the top drive is plotted alongside the filtered FFT data record 401 (FIG. 4).

A trace 413 inside a rectangle 414 (FIG. 4) can be judged as being generated by the rotation of the top drive for either of the following two points (or reasons). First, trace 413 only presents when the top drive rotates (for example, the rotation rate 421 >0). Second, the frequency of trace 413 follows or mimics the top drive rotation rate 421. To confirm the second point, the frequency of trace 413 is plotted against the top drive rotation rate 421 in FIG. 6.

FIG. 6 is a graph showing an example of a plot 600 showing a dependence of the frequency of trace 413 on the rotation rate 421 of the top drive, according to some implementations of the present disclosure. The plot 600 is plotted relative to a top drive rotation rate 602 (for example, in rounds per minute) and a frequency 604 (for example, in Hz). As shown in FIG. 6, the frequency of trace 413 totally depends on the rotation rate 421 of the top drive. Traces, such as 413, generated by the rotation of the top drive should be filtered out. The filtering can be completed, for example, using a workflow detailed in FIG. 7. For example, the filtering can be completed by applying a "Top Drive Rotation Generated (TDRG) Trace Filter Module" 700.

Figure 7:
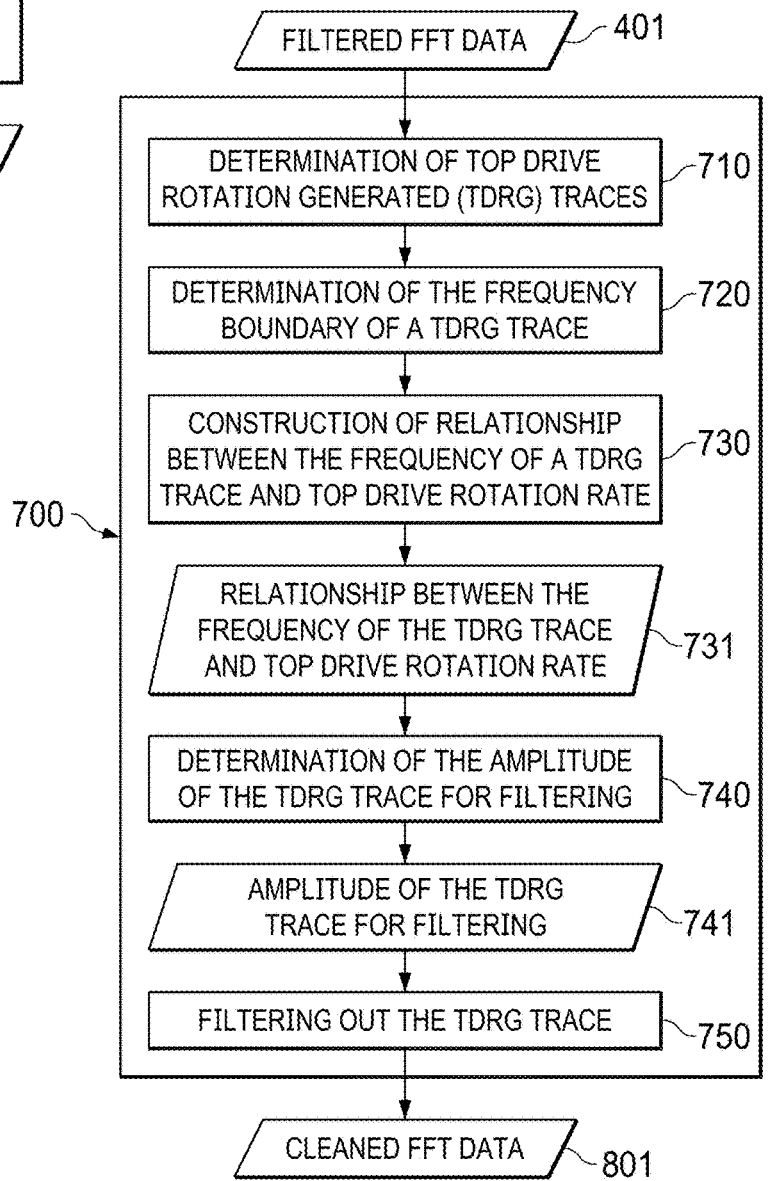
FIG. 7 is a flow diagram showing an example of a workflow detailing the steps for filtering out traces generated by top drive rotation, according to some implementations of the present disclosure.

FIG. 7 is a flow diagram showing an example of a workflow detailing the steps for filtering out traces generated by top drive rotation, according to some implementations of the present disclosure. At 710, the filtered FFT data 401 is checked to determine (or decide) TDRG traces. At 720, for each one of the decided TDRG traces 413, the trace's frequency boundary 415 (FIG. 4) is decided. At 730, a relationship 731 between the frequency of the TDRG trace and the top drive rotation rate 421 is derived by using all the data points within the frequency range 415. This includes the regression line 605 and a confidence level (for example, 90%) interval 607 (FIG. 6). At 740, the Amplitude of the TDRG Trace for Filtering 741 is calculated, which is a value between the mean and the maximum of the amplitudes of all the data points within the confidence interval 607. At 750, the TDRG trace is filtered out by applying the following rules to all the data points within the confidence interval 607:

If Amplitude<Amplitude of the TDRG Trace for Filtering, Updated Amplitude=0, else Updated Amplitude=Amplitude−Amplitude of the TDRG Trace for Filtering    (2)

Each of the decided TDRG traces can be filtered by applying the procedure from steps 710 to 750 to generate "Cleaned FFT Data" 801.

General Approach for Evaluating Rock Physical Properties

Figure 8:
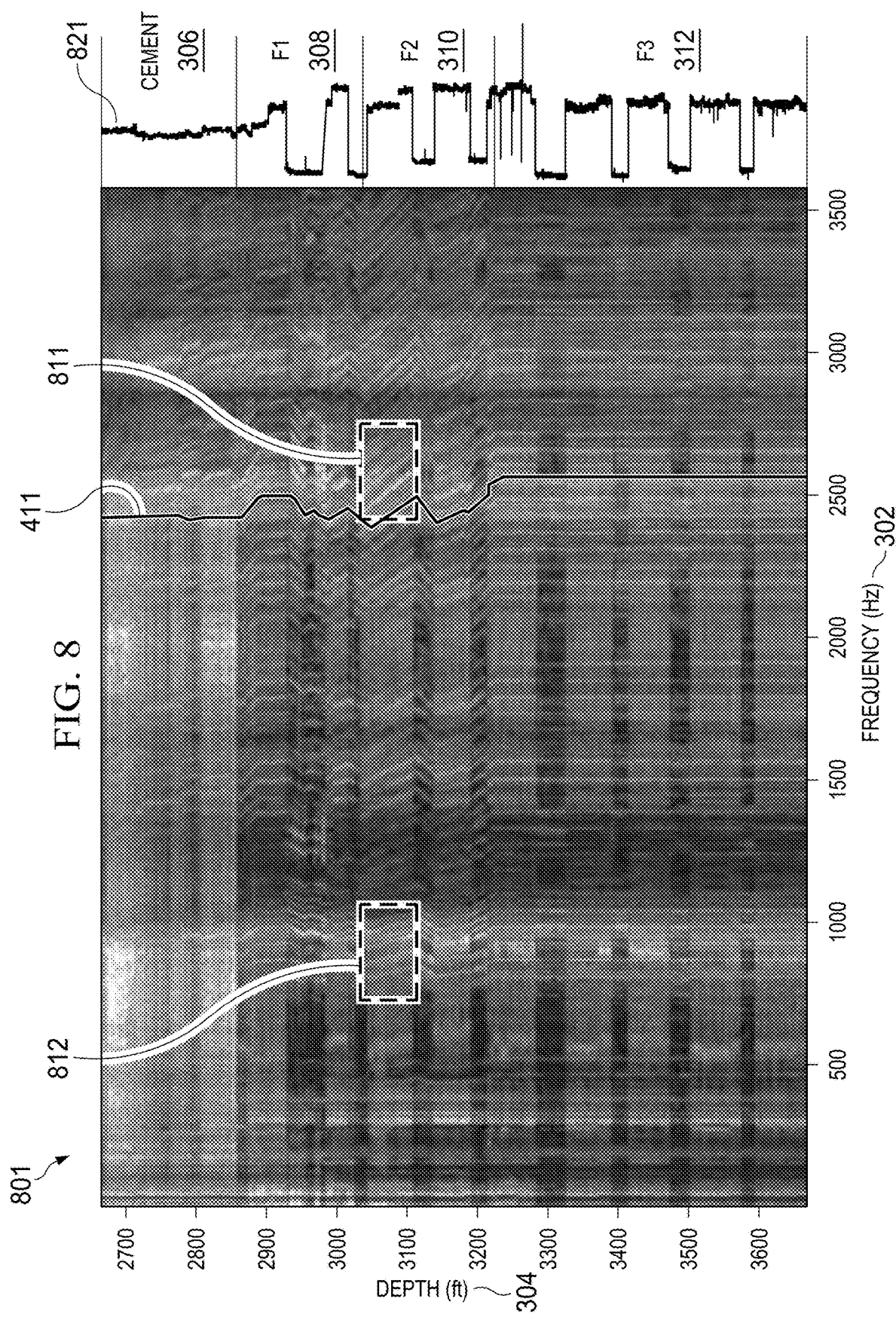
FIG. 8 is a graph showing an example of a plot showing filtered FFT data with drill bit rotation rate plotted alongside, according to some implementations of the present disclosure.

FIG. 8 is a graph showing an example of a plot showing filtered FFT data with drill bit rotation rate 821 plotted alongside, according to some implementations of the present disclosure. As shown in FIG. 8, when the amplitudes of the traces in FIG. 8 are compared with the drill bit rotation rate 821, it is clear that the amplitudes of most of the traces are positively and heavily affected by the rotation rate. Greater rotation rates produce greater amplitudes. Except for a few traces around the 1 KiloHertz (KHz) frequency, the effect is opposite. In conclusion, the drill bit rotation rate affects amplitudes of drilling acoustic signals. Therefore, drill bit rotation rate should be included as an input in the evaluation of rock physical properties.

Recorded drilling acoustic signals in some frequency range can be more related to background noise, or drilling environment. For example, recorded drilling acoustic signals 801 with a frequency >3600 Hz (not shown in FIG. 8) can be judged as being contributed by background noise, since the signals do not vary with the formations. Within a certain frequency range, drilling acoustic signals are more closely related with lithology. In this frequency range, the drilling acoustic signals can be used in the evaluation for lithology types and properties. This frequency range is termed Lithological Significant Frequency Range.

To maximally extract lithology information, all data points in a Lithological Significant Frequency Range on a filtered FFT data 203 can be included in the inputs to fully utilize the richness of the data. To enable model construction and application, the number of input data elements should be constant. For the convenience, the constant number of data points within a lithological significant frequency range are hereafter referred to as called Significant Data Points. Since the drill bit rotation rate also heavily affects recorded drilling acoustic signals, the drill bit rotation rate is included as an input in data process.

Figure 9:
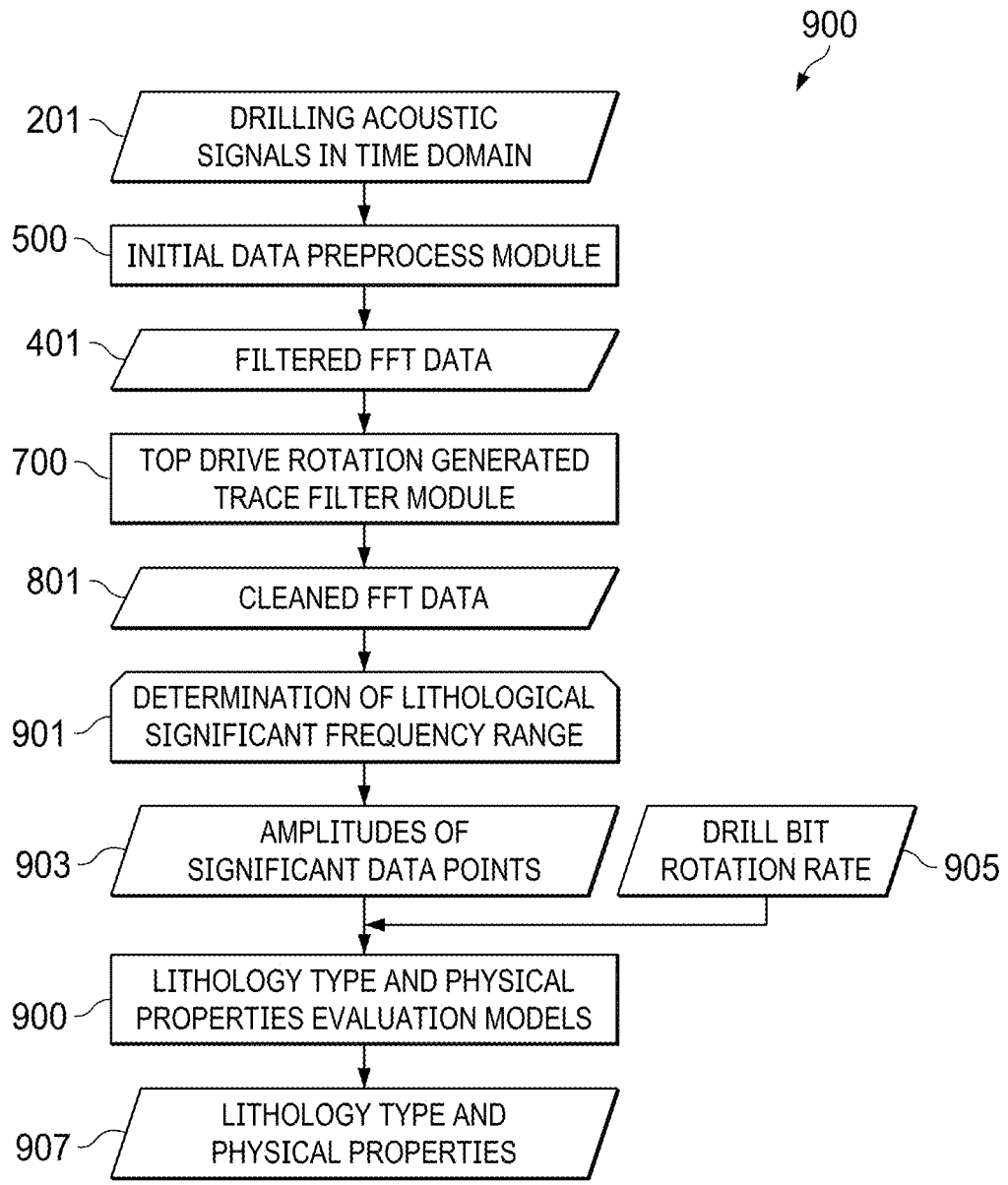
FIG. 9 is a flow diagram showing an example of a general workflow for evaluating lithology type and physical properties, according to some implementations of the present disclosure.

FIG. 9 is a flow diagram showing an example of a general workflow for evaluating lithology type and physical properties, according to some implementations of the present disclosure. First, drilling acoustic signals in time domain 201 are processed by using an initial data preprocessing module 500 to produce filtered FFT data 401. The filtered FFT data 401 can be further processed to remove top drive rotation generated traces by applying the TDRG Trace Filter Module 700 to produce cleaned FFT data 801. At 901, a Lithological Significant Frequency Range is decided. All data points within the decided Lithological Significant Frequency Range can be used as inputs. The data points are considered Significant Data Points. Amplitudes of the significant data points 903 and drill bit rotation rate 905 are used together as inputs to a set of Lithology Type and Physical Properties Evaluation Models 900 to derive lithology type and physical properties 907. The significant data points 903 can be input in the order of their frequency sequence. For drill bit rotation rate 905, either its own value, or its two components (top drive and mud motor rotation rates) can be used as inputs.

Two types of "Type and Physical Properties Evaluation Models" 900 can be constructed: 1) "Direct Rock Property Evaluation Models" and 2) "Indirect Rock Property Evaluation Models". These models can be referred to as Method 1 and Method 2.

Method 1: Direct Rock Property Evaluation Models

Figure 10A:
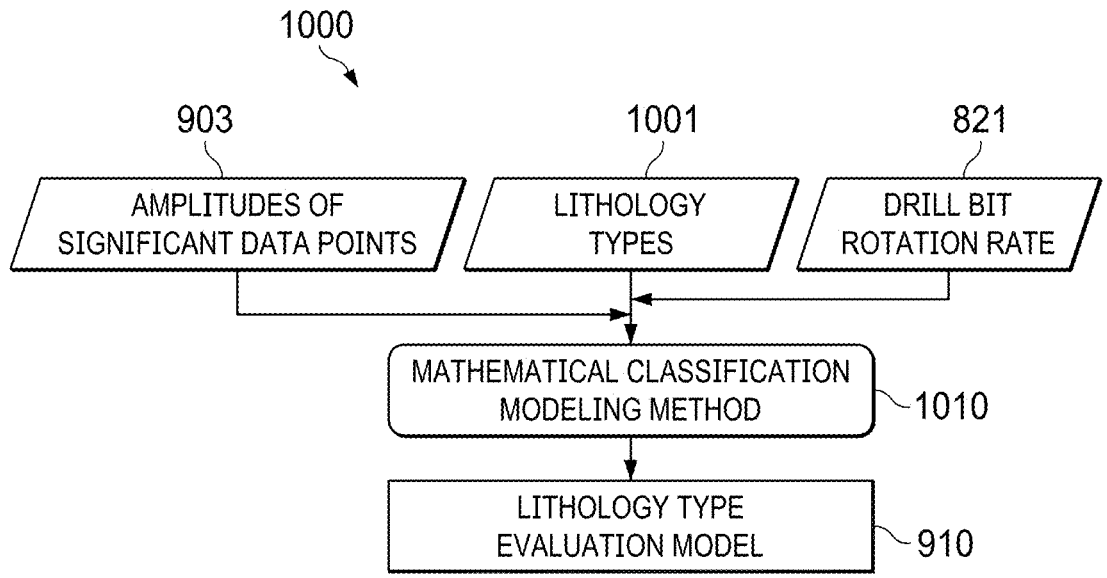
FIGS. 10A and 10B are flow diagrams showing examples of workflows for constructing direct lithology type and physical properties evaluation models, according to some implementations of the present disclosure.
Figure 10B:
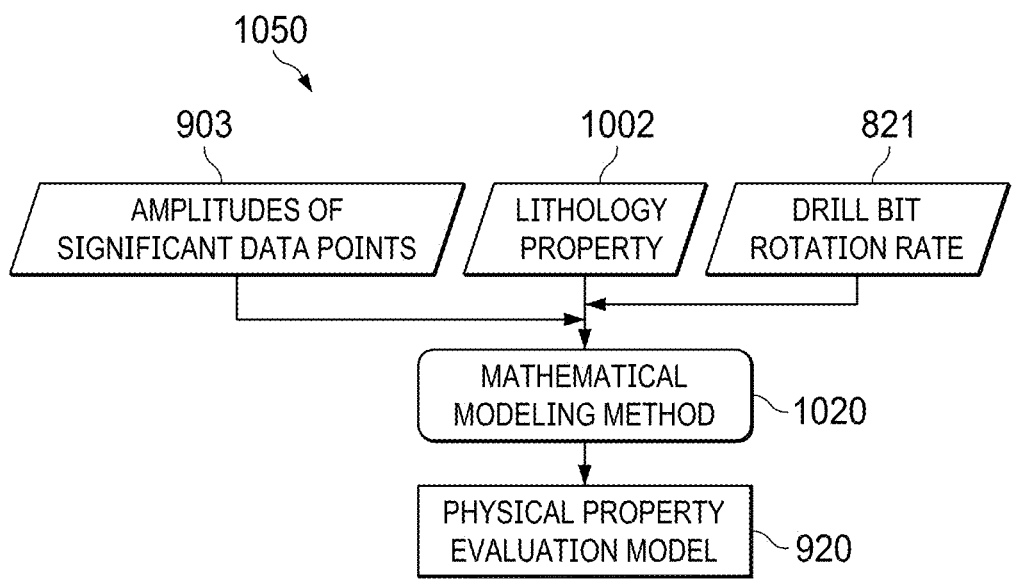

FIGS. 10A and 10B are flow diagrams 1000 and 1050 showing examples of workflows for constructing direct lithology type and physical properties evaluation models, according to some implementations of the present disclosure. The Lithology Type and Physical Properties Evaluation Models 900 (FIG. 9) can include two models: Lithology Type Evaluation Model 910 and Physical Property Evaluation Model 920.

Physical properties for different lithologies can be collected as a first step. A Lithology Type Evaluation Model 910 (FIG. 10A) can be constructed by employing a Mathematical Classification Modeling Method 1010, such as using statistical methods and artificial neural network modeling techniques. The data used in the modeling construction can include Lithology Types 1001, Amplitudes of Significant Data Points 903, and Drill Bit Rotation Rate 821. The significant data points 903 can be input in the order of their frequency sequence in the model construction. For the drill bit rotation rate 821, either its own value, or its two components (top drive and mud motor rotation rates) can be used.

For the construction of physical property evaluation models, at least two approaches can be used. A first approach is to construct models for a given type lithology, for example, where the models are lithology type-specific models. A second approach is to construct lithology-independent models. For the first approach, an application can first evaluate lithology types. Then, lithology type-specific physical property evaluation models can be applied based on the evaluated lithology type. A Physical Property Evaluation Model 920 (FIG. 10B) can be constructed by employing a Mathematical Modeling Method 1020, such as including statistical methods and artificial neural network modeling techniques. The data used in the modeling construction can include Lithology Property 1002, Amplitudes of Significant Data Points 903, and Drill Bit Rotation Rate 821. The significant data points 903 can be input in the order of their frequency sequence in the model construction. For the drill bit rotation rate 821, either the rate's own value or its two components (top drive and mud motor rotation rates) can be used.

Method 2: Indirect Rock Property Evaluation Models

In this technique, the effect of drill bit rotation can be minimized at data points level by reducing the contribution of the drill bit rotation to the measured amplitudes. The resulting drilling acoustic signal data can be termed as the Normalized Drilling Acoustic Signal Data. Mathematical models can be constructed and applied by using the Normalized Drilling Acoustic Signal Data.

As previously described, the amplitudes of most of traces are positively and heavily affected by the drill bit rotation rate. Specifically, the amplitudes of FFT data are affected by drill bit rotation. To eliminate the effect of drill bit rotation, a relationship between the amplitude and the drill bit rotation rate for each trace can be constructed. The constructed relationships can be applied to eliminate the effect of drill bit rotation. To construct the relationships, the traces need to be tracked.

Traces Tracking

Techniques used to track traces can be based on following observed facts. First, a trace forms through linking local maxima (or peak), in general from sample to sample (for example, Trace 411 on FIG. 4). Second, the frequency of a trace varies along depth. Third, between traces, frequency variations along depth are different. For example, the frequencies of traces in square 811 (FIG. 8) change faster along depth than those of traces in square 812. As a result, the frequency differences between two neighboring traces may change from sample to sample. For example, for a sample in the formation F2 310 on FIG. 8, the frequency distribution is "stretched" when compared with the sample above (FIGS. 12A and 12B also shows such an example). Fourth, the amplitudes of two neighboring FFT samples 801 do not necessarily have similar trends along frequency, which is caused by the changing of rock properties, drill bit rotation, and background noise. FIGS. 12A and 12B show such an example.

Tracking can be conducted by adding sample by sample and by aligning (linking) the significant data points between the current sample (the last one added) and the next sample. Tracking can go either direction, forward (downward along depth), or backwards (upward along depth). The result is a two-dimensional array (for example, indexed by samples and tracked traces) containing two parameters: frequency and amplitude. The array can be named "Trace Array". For explicit clarity, the last added sample can be named "Current Sample", while the sample that is going to be added next can be named "Sample-in-process".

After traces are tracked, a relationship between amplitude and drill bit rotation rate for each trace can be constructed. The constructed relationships can be applied to traces to minimize the effect of drill bit rotation. The disclosed tracking algorithm/procedure 1100 is detailed in FIG. 11.

Figure 11:
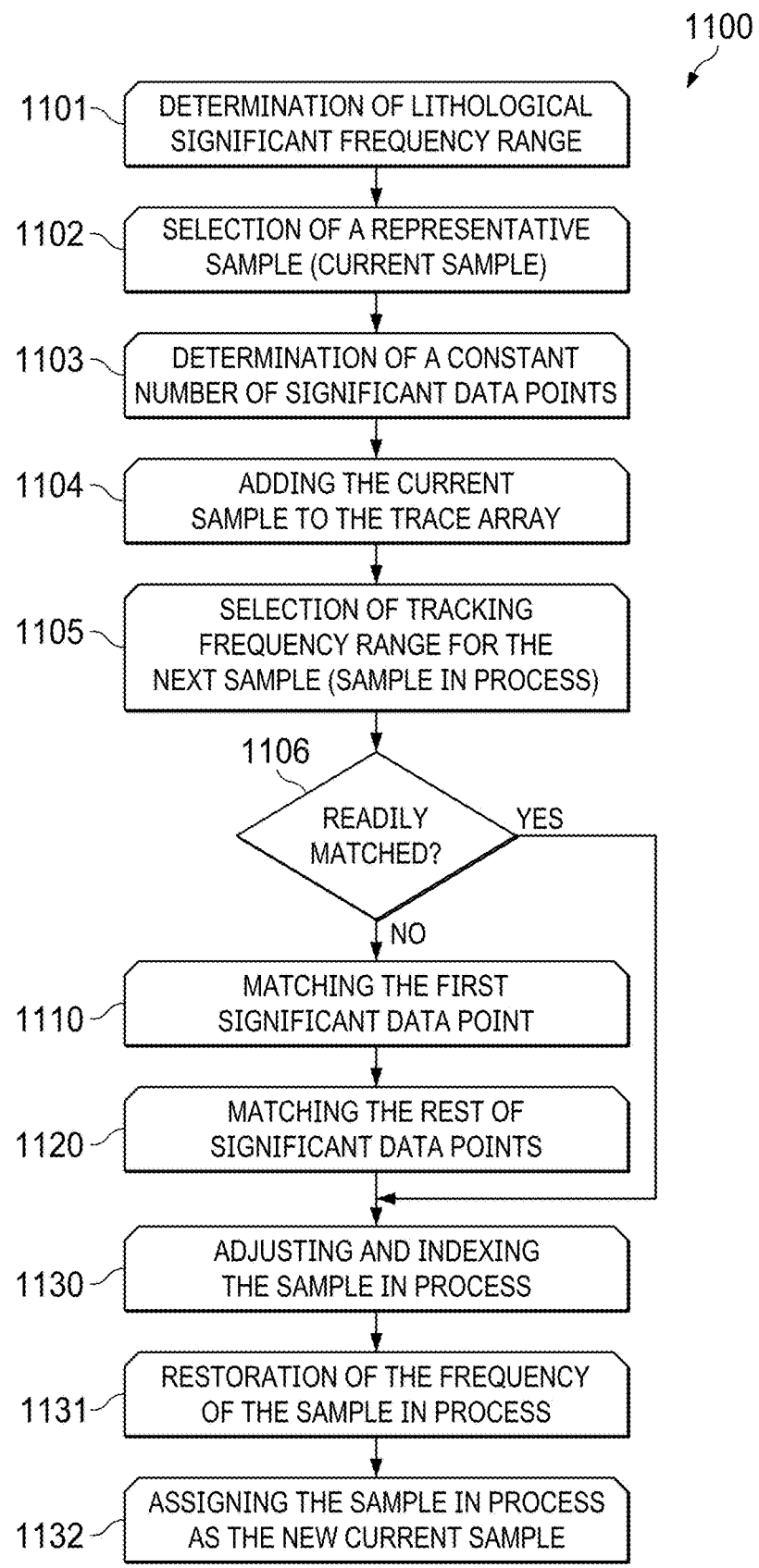
FIG. 11 is a flow diagram showing an example of a workflow for tracking traces, according to some implementations of the present disclosure.

FIG. 11 is a flow diagram showing an example of a workflow for tracking traces, according to some implementations of the present disclosure. At step 1101, a lithological significant frequency range is decided and applied among whichever one of the models is constructed. At step 1102, a representative sample (from which the trace tracking starts) is selected. At this step, the representative sample is the "current sample". At step 1103, a constant number of significant data points within the decided lithological significant frequency range are decided. These significant data points are the starting points of the traces to be tracked. The number of traces is the number of the significant data points. At step 1104, the tracked significant data points are indexed, starting from the lowest frequency, and then added to the trace array.

During tracking, the data points are compared between the Current Sample and Sample-in-process in a certain frequency interval. The certain frequency interval can be named "Tracking Frequency Range". The interval can be slightly wider at both ends of the Lithological Significant Frequency Range 1101.

At step 1105, the next sample, "Sample-in-process" is tracked. The tracking frequency range for the sample-in-process is decided to make it wider at both ends than that of the current sample to ensure the range contains all the potential significant data points (for example, the trace data points). FIGS. 12A and 12B show example tracking frequency ranges of a current sample and a sample-in-process. All of the tracking processes can be conducted within the defined tracking frequency range. For convenience, a "Match" occurs between a local maximum on the current sample and a local maximum on the next sample means these two data points locate at the same or similar frequency.

At step 1106, a check is made whether the significant data points of the sample-in-process are already matched with those of the current sample. For example, the frequencies of the traces in formation F3 312 on FIG. 8 almost do not change. That is, most of the maxima match between neighboring samples. Between the current sample and the sample-in-process, if the proportion of the local maxima of the current sample matching the local maxima of the sample-in-process is higher than a threshold (for example, 90%), then the two samples can be judged as "Readily Matched." If the two samples are judged as readily matched, then the process can advance to step 1130, or otherwise advance to step 1110.

At step 1110, the first significant data point of the sample in the process is decided. For example, a data point is found to match the first significant data point of the current sample. Deciding the first significant data point can be done by correlation analysis between the current sample and the sample-in-process by using a "Screening Window." A "screening window" is the lower frequency end section, containing a certain portion (for example, 20%) of the significant data points of the current sample.

FIGS. 12A and 12B are graphs showing example of plots 1200 and 1250 containing tracking frequency range, screening window, and screening range on a current sample and a sample-in-process, according to some implementations of the present disclosure. The plots 1200 and 1250 are plotted relative to frequency 302 and an amplitude 1202 (for example, in gravitational acceleration (g)). A certain range (termed "Screening Range") of the lower frequency end section of the sample-in-process is screened. The "Screening Range" is wider than the "Screening Window" by the similar portion as between the tracking frequency ranges of the sample-in-process and the current sample. The location and frequency of the first significant data point of the sample-in-process can be decided by screening the data within the screening range with the screening window, frame-by-frame. A frame is a section of the screening range of the sample-in-process and have the same data points as the screening window. A frame is separated from its adjacent neighbor by one data point. The screening can be conducted by calculating the correlation coefficient between the data points of the screening window and those of a frame. Each time after a frame is screened, the screening window can be moved one data point forward to enter the next frame. The frame with the highest correlation coefficient is the corresponding matched section of the screening window, and is named "Matched Frame". A data point in the matched frame that matches the relative sequential position of the first significant data point of the current sample is decided as the first significant data point of the sample-in-process.

Figure 13:
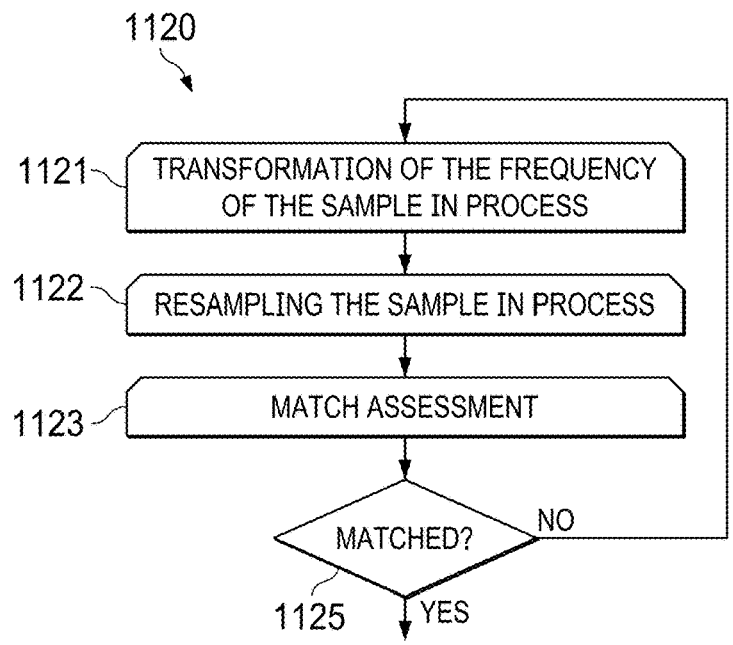
FIG. 13 is a flow diagram showing an example of a workflow for matching significant data points by frequency transformation, according to some implementations of the present disclosure.

The next process 1120 (FIG. 11) is to match the rest of the significant data points between the current sample and the sample-in-process. The matching can be an iteration process, consisting several steps (FIG. 13). As previously described, the frequency differences between traces can change from sample to sample. To track a sample, the frequency of the sample-in-process should be changed, in order to match the frequency of the previous sample (current sample). Therefore, the first step in the process 1120 is to transform the frequency of the sample-in-process (Step 1121, FIG. 13), by applying the following linear frequency transformation:

$$F_T = F_0^C + C(F - F_0) \tag{3}$$

where, $F_T$ is the transformed frequency of the sample-in-process (for example, in Hz), $F_0^C$ is the frequency of the first significant data point of the current sample (for example, in Hz), C is a transformation constant, F is a frequency of the data point of the sample-in-process (for example, in Hz), and $F_0$ is the frequency of the first significant data point of the sample-in-process.

FIG. 13 is a flow diagram showing an example of a workflow 1120 for matching significant data points by frequency transformation, according to some implementations of the present disclosure. After transformation, the first significant data point of the sample-in-process has the same frequency of the first significant data point of the current sample. The frequency distribution of the sample-in-process is either stretched (with C>1) or compressed (with C<1).

After transformation, the frequency differences between the significant data points of the sample-in-process may become closer to those on the current sample. However, within a correspondent frequency range, the number of the data points of the sample-in-process is different from that of the current sample. To do the match analysis, the data points in the sample-in-process need to be resampled at step 1122 (FIG. 13), starting from the first significant data point, at the frequencies of the data points of the current sample.

At step 1123, the transformed sample-in-process is compared with the current sample to evaluate the "Level of Match". The comparison can be done in two ways. In a first approach, the number of the local maxima of the current sample which match the local maxima of the transformed sample-in-process is counted. The level of match is represented by the percentage of the matched data points. In a second approach, the correlation coefficient between the current sample and the transformed sample-in-process can be used as a level of match. In the correlation analysis, the data points start from the first significant data point for both samples.

The procedure can be repeated from step 1121. In each iteration, the constant C can be changed monotonically by a small amount. During iterations, the level of match may increase until it reaches to a maximum value, then decreases. The level of match can be tested at step 1125. If a maximum level of match is achieved, then the iteration can be judged as matched. Otherwise, the iteration is continued.

At this stage of match, most of the local maxima of the current sample can be matched with the local maxima of the sample-in-process. Some of the local maxima of the current sample may not be matched. Two situations can cause this. First, a local maximum does not exist. In a second situation, the position (or frequency) of the corresponding local maximum of the sample-in-process has a small difference from the corresponding one of the current sample. At step 1130 (FIG. 11), the data points of the sample-in-process within a frequency vicinity of an unmatched local maximum of the current sample are checked to find a local maximum. If a local maximum is found, then the local maximum can be treated as the corresponding local maximum of the sample-in-process. In this case, some data points around the newly-matched local maximum of the sample-in-process can be re-matched with the data points around the newly-matched local maximum of the current sample. Now, the sample-in-process has been matched with the current sample. That is, each significant data point of the current sample has been matched/paired with a significant data point of the sample-in-process. The matched data points of the sample-in-process is indexed at step 1130. For example, the matched data points can be assigned a serial number, sequentially from low to high frequency.

At step 1131, the frequencies of the significant data points of the sample-in-process can be restored by using the inversed Equation (3) provided by Equation (4):

$$F = F_0 + \frac{1}{C}(F_T - F_0^C) \tag{4}$$

where, C and $F_T$ are values at the iteration of the maximum level of match.

At step 1132, the sample-in-process is assigned as the new current sample. The significant data points of the new current sample can be added to the trace array at step 1104. The process, starting from step 1105, can be repeated until all the samples of the cleaned FFT data 801 are processed to produce a trace array.

In some implementations, alternative approaches can be used for two steps in the process. First, at step 1110 ("Matching the First Significant Data Point"), the first significant data point of the sample-in-process can be decided by correlation analysis between the current sample and the sample-in-process. In an alternative approach, each of the first certain number of significant data points within the tracking frequency range (FIGS. 12A and 12B) of the sample-in-process is taken as the first significant data point. The corresponding level of match is evaluated at the process 1120. The data point with the highest level of match is used as the first significant data point.

For step 1121 in the process, a linear transformation (Equation (3)) is introduced to illustrate the process. A non-linear frequency transformation can be used, as it may be able to better capture the traces' frequency variation trend between samples.

Model Construction

In this process, a trace array that is derived from Cleaned FFT Data 801 by employing the Tracking Procedure 1100 is firstly processed to minimize the effect of drill bit rotation through a normalization procedure to produce a Normalized Trace Array. The normalized trace array is used in the model construction. As such, drill bit rotation is not used directly as an input in the model construction. In some implementations, constructing the model can include the following steps.

First, a mathematical relationship between the amplitudes on each trace and the drill bit rotation rate can be constructed. At least two alternative techniques can be used in the construction of the relationship. A first technique includes using the drill bit rotation rate. The second technique includes using the two components of drill bit rotation rate (top drive and mud motor rotation rates). The mathematical relationship between the amplitudes on each trace and the drill bit rotation rate can be represented by the general form in Equation (5):

$$A_t^M = f(R_b) \text{ or } A_t^M = f(R_d, R^m) \tag{5}$$

where, $A_t^M$ is the modelled amplitude of a trace, f is a function, $R_b$ is the drill bit rotation rate, $R_d$ is the top drive rotation rate, and $R_m$ is the mud motor rotation rate. Since amplitudes of drilling acoustic signals are affected by both lithology and drill bit rotation, the constructed relationship in Equation (5) can be used to capture the effect of drill bit rotation rate.

Second, a trace array can be processed to minimize the drill bit rotation to produce a normalized trace array by employing one of two alternative approaches. In the first approach, a trace array is processed by using the following equation (Eq. 6) to derive the corresponding normalized trace array:

$$A_i^N = \frac{A_i}{A_{ti}^M} \quad (6)$$

where $A_i$ is the measured amplitude of data point i on a trace, $A_{ti}^M$ is the modeled amplitude from the drill bit rotation rate of data point i on the trace, and $A_i^N$ is the normalized amplitude of data point i on the trace.

In the second of the two alternative approaches, a trace array is processed by using the following two equations (Eqs. 7 and 8) to derive the corresponding normalized trace array. The effect of the drill bit rotation rate on the drilling acoustic signals on a trace can be minimized by deducting a modelled amplitude from the measured ones, as shown in Equation (7):

$$\Delta A_i = A_i - A_{ti}^M. \quad (7)$$

where, $A_i$ is the measured amplitude of data point i on the trace, and $A_{ti}^M$ is the modeled amplitude from the drill bit rotation rate of data point i on the trace. The effect of the drill bit rotation rate may optionally further be reduced through normalization by rotation rate, as shown in Equation (8):

$$\Delta A_i^N = \Delta A_i \cdot \frac{R_b^C}{R_{bi}} \quad (8)$$

where $\Delta A_i^N$ is the normalized amplitude of data point i on the trace, $R_{bi}$ is the drill bit rotation rate of data point i on the trace, and $R_b^C$ is a constant drill bit rotation rate (rate is equal on all data points on all traces).

Third, mathematical models can be constructed between the normalized amplitudes of significant data points and rock physical properties, such as type and porosity. In this process, the drill bit rotation rate is not a direct input. The procedure for processing a trace array to produce a Normalized Trace Array is summarize in FIG. 14.

Figure 14:
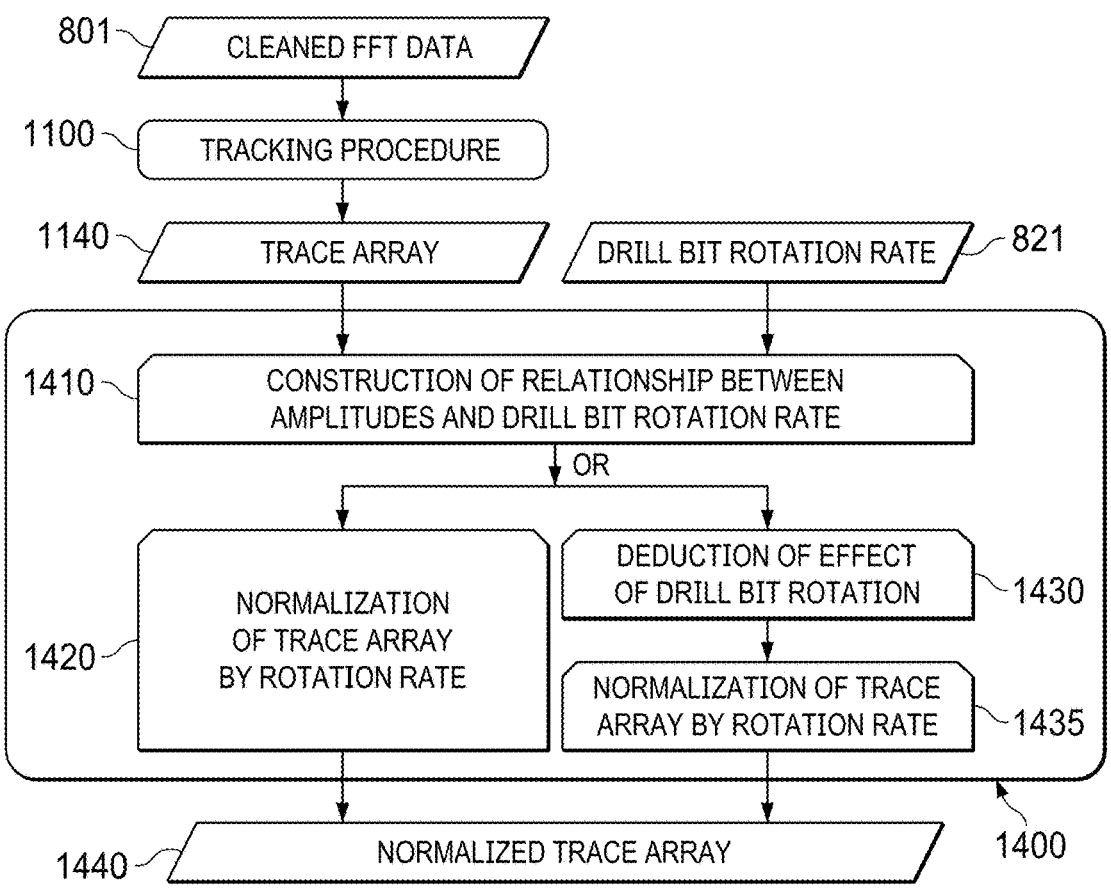
FIG. 14 is a flow diagram showing an example of a workflow for processing a trace array to produce a Normalized Trace Array, according to some implementations of the present disclosure.

FIG. 14 is a flow diagram showing an example of a workflow for processing a trace array to produce a Normalized Trace Array, according to some implementations of the present disclosure. A trace array 1140 that is derived from Cleaned FFT Data 801 by employing the Tracking Procedure 1100 is processed by employing a Normalization Procedure 1400. The processing can include minimizing the effect of drill bit rotation, resulting in a Normalized Trace Array 1440. In some implementations, the Normalization Procedure 1400 can include the following steps. First, a mathematical relationship between the amplitudes of each trace of the trace array 1140 and the drill bit rotation rate 821 is constructed at step 1410. Modelled amplitudes are calculated by using the constructed relationship between the amplitudes and the drill bit rotation rate. The modelled amplitudes are used to derive a normalized trace array by employing two alternative approaches. In the first of the two alternative approaches, at step 1420, the effect of the drill bit rotation rate on drilling acoustic signals on a trace is minimized by dividing the measured amplitudes by the modelled amplitudes (Eq. 6), resulting in a Normalized Trace Array 1440. In the second of the two alternative approaches, at step 1430, the effect of the drill bit rotation rate on drilling acoustic signals of a trace is minimized by deducting modelled amplitudes (Eq. 7). At step 1435, the effect of the drill bit rotation rate may be optionally further reduced through normalization by the rotation rate (Eq. 8), resulting in a Normalized Trace Array 1440. The normalized trace array 1440 is a two-dimensional array with sample and trace being the row and column indices. The normalized trace array 1440 contains frequency and normalized amplitude.

Figure 15A:
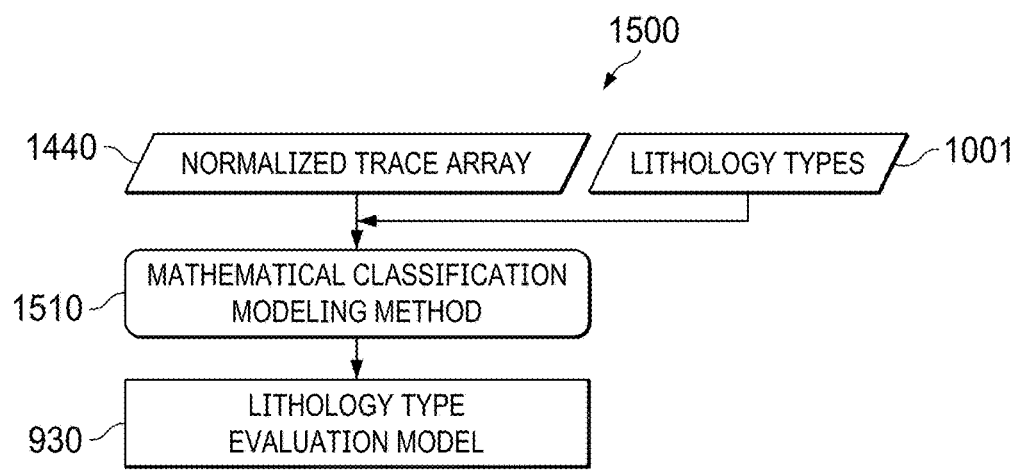
FIGS. 15A and 15B are flow diagrams showing examples of workflows for generating indirect rock property evaluation models, according to some implementations of the present disclosure.
Figure 15B:
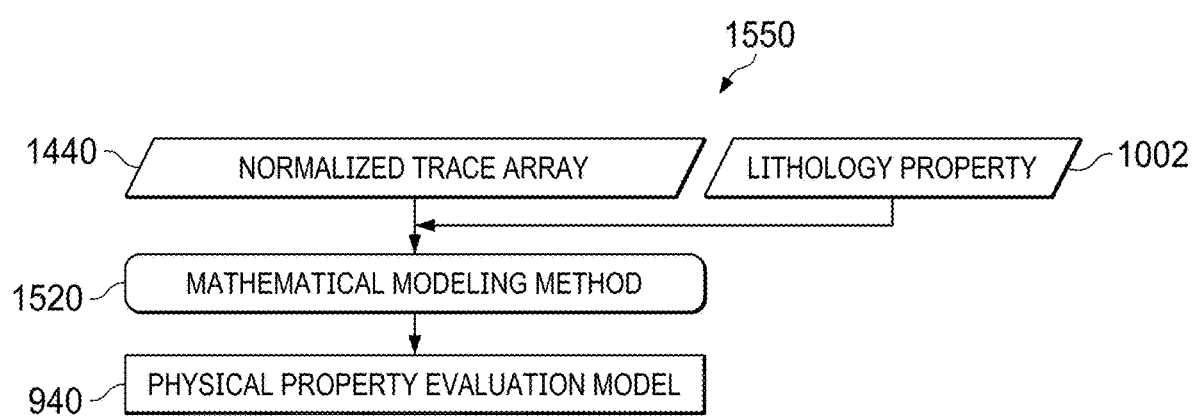

The process used for constructing indirect rock property evaluation models is summarized in FIGS. 15A and 15B. The Lithology Type and Physical Properties Evaluation Models 900 (FIG. 9) includes two models: the Lithology Type Evaluation Model 930 and the Physical Property Evaluation Model 940 (FIGS. 15A and 15B).

FIGS. 15A and 15B are flow diagrams showing examples of workflows 1500 and 1550 for generating indirect rock property evaluation models, according to some implementations of the present disclosure. Physical properties for different lithologies are collected. A Lithology Type Evaluation Model 930 (FIG. 15A) can be constructed by employing a Mathematical Classification Modeling Method 1510, such as by using statistical methods and artificial neural network modeling techniques. The data used in the modeling construction includes Lithology Types 1001 and Normalized Trace Array 1440.

For construction of physical property evaluation models, two approaches can be used. In a first approach, models are constructed for a given type lithology, for example, where the models are lithology type-specific models. In a second approach, lithology independent models are constructed. In the first approach, within the application, lithology types are evaluated first. Then lithology type-specific physical property evaluation models are applied based on the evaluated lithology type. A Physical Property Evaluation Model 940 (FIG. 15B) is constructed by employing a Mathematical Modeling Method 1520, for example, using statistical methods and artificial neural network modeling techniques. The data used in the modeling construction include Lithology Property 1002 and Normalized Trace Array 1440.

When the mathematical models 930 and 940 are applied in the procedure as summarized in FIG. 9, the input "amplitudes of significant data points" 903 are normalized ones of a trace array 1440 accordingly. In this case, drill bit rotation rate 905 is not an input. The trace array 1440 is generated from cleaned FFT data 801, first by the Tracking Procedure 1100 and then using the Normalization Procedure 1400.

Figure 16:
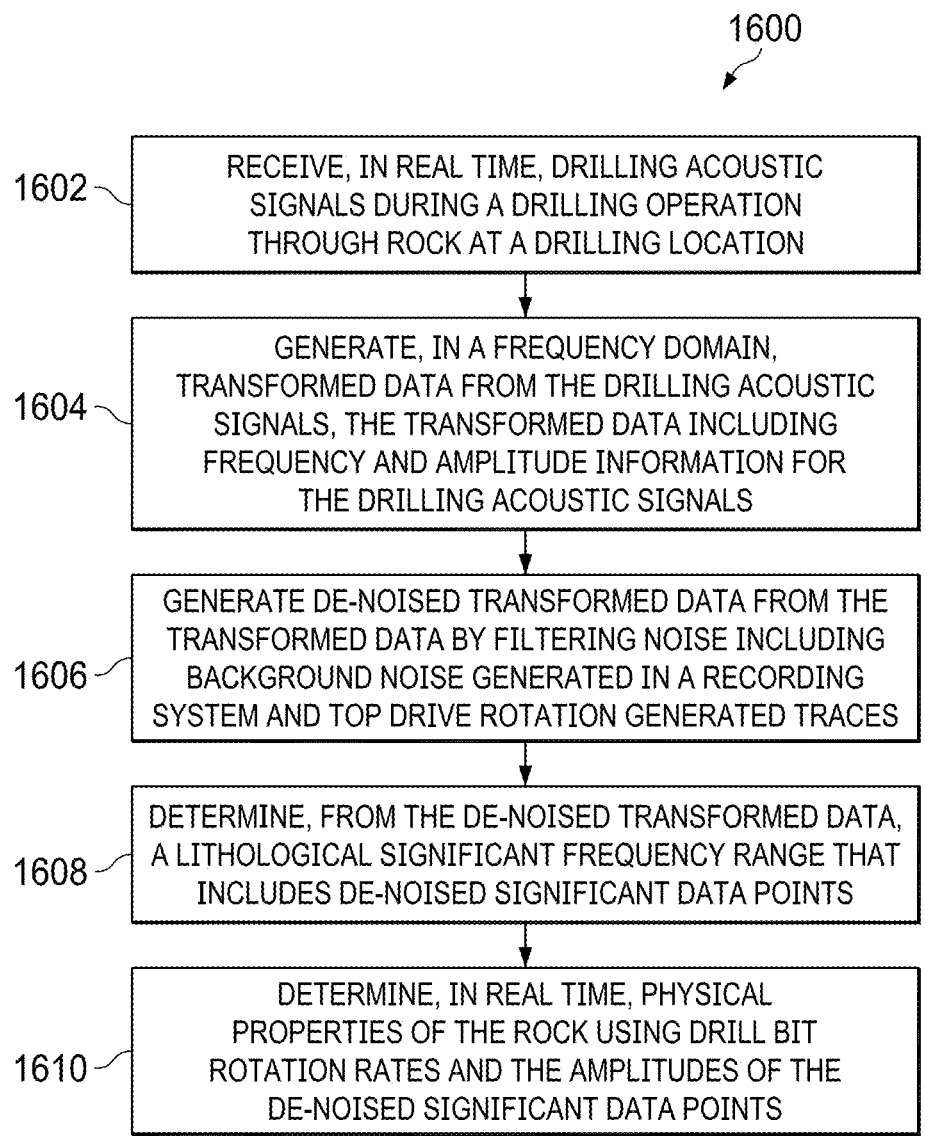
FIG. 16 is a flowchart of an example of a method for evaluating rock physical properties from drill sounds, where the effect of the drill bit rotation rate is minimized, according to some implementations of the present disclosure.

FIG. 16 is a flowchart of an example of a method 1600 for evaluating rock physical properties from drill sounds, where the effect of the drill bit rotation rate is minimized, according to some implementations of the present disclosure. For clarity of presentation, the description that follows generally describes method 1600 in the context of the other figures in this description. However, it will be understood that method 1600 can be performed, for example, by any suitable system, environment, software, and hardware, or a combination of systems, environments, software, and hardware, as appropriate. In some implementations, various steps of method 1600 can be run in parallel, in combination, in loops, or in any order.

At 1602, drilling acoustic signals are received in real time during a drilling operation occurring through rock at a drilling location. The drilling acoustic signals can include, for example, one or more of: drill sounds obtained by one or more acoustic sensors attached directly to a drive shaft or to an extension of the drive shaft of a drill rig on surface; and drill sounds obtained by a downhole subassembly adjacent to a drill bit. In some implementations, the acoustic signals can be digitized by a data acquisition unit. From 1602, method 1600 proceeds to 1604.

At 1604, transformed data is generated from the drilling acoustic signals. The transformed data is generated in a frequency domain and includes frequency and amplitude information for the acoustic signals. For example, generating the transformed data can include using a Fast Fourier Transformation (FFT) to transform the drilling acoustic signals into the transformed data. From 1604, method 1600 proceeds to 1606.

At 1606, de-noised transformed data is generated from the transformed data by filtering noise. Generation of the de-noised transformed data can include filtering out background noise generated in a recording system, top drive rotation generated traces, for example. From 1606, method 1600 proceeds to 1608.

At 1608, a lithological significant frequency range that includes significant data points is determined from the de-noised transformed data. Determining the lithological significant frequency range of the significant data points can include omitting signals above a threshold frequency, for example. From 1608, method 1600 proceeds to 1610.

At 1610, physical properties of the rock are determined in real time using a drill bit rotation rate and the de-noised significant data points. As an example, the physical properties can include porosity, water saturation, permeability, a presence of fractures, a lithology type, and a presence of hydrocarbons. Determining the physical properties of the rock can include executing models to process the amplitudes of the de-noised significant data points and accounting for the drill bit rotation rate. The models can include a lithology type evaluation model and a physical property evaluation model, for example. Accounting for the drill bit rotation rate can include accounting for a top drive rotation rate and a mud motor rotation rate. After 1610, method 1600 can stop.

Figure 17:
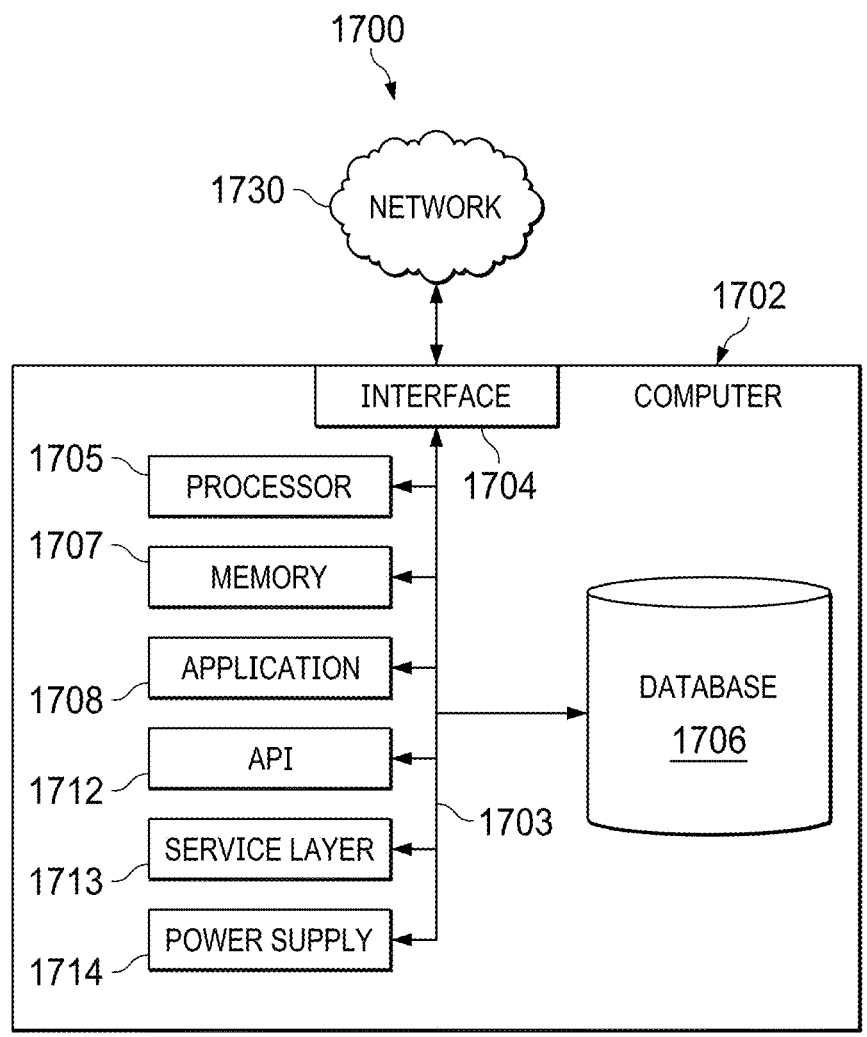
FIG. 17 is a block diagram illustrating an example computer system used to provide computational functionalities associated with described algorithms, methods, functions, processes, flows, and procedures as described in the present disclosure, according to some implementations of the present disclosure.

FIG. 17 is a block diagram of an example computer system 1700 used to provide computational functionalities associated with described algorithms, methods, functions, processes, flows, and procedures described in the present disclosure, according to some implementations of the present disclosure. The illustrated computer 1702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1702 can include input devices such as keypads, keyboards, and touch screens that can accept user information. Also, the computer 1702 can include output devices that can convey information associated with the operation of the computer 1702. The information can include digital data, visual data, audio information, or a combination of information. The information can be presented in a graphical user interface (UI) (or GUI).

The computer 1702 can serve in a role as a client, a network component, a server, a database, a persistency, or components of a computer system for performing the subject matter described in the present disclosure. The illustrated computer 1702 is communicably coupled with a network 1730. In some implementations, one or more components of the computer 1702 can be configured to operate within different environments, including cloud-computing-based environments, local environments, global environments, and combinations of environments.

At a top level, the computer 1702 is an electronic computing device operable to receive, transmit, process, store, and manage data and information associated with the described subject matter. According to some implementations, the computer 1702 can also include, or be communicably coupled with, an application server, an email server, a web server, a caching server, a streaming data server, or a combination of servers.

The computer 1702 can receive requests over network 1730 from a client application (for example, executing on another computer 1702). The computer 1702 can respond to the received requests by processing the received requests using software applications. Requests can also be sent to the computer 1702 from internal users (for example, from a command console), external (or third) parties, automated applications, entities, individuals, systems, and computers.

Each of the components of the computer 1702 can communicate using a system bus 1703. In some implementations, any or all of the components of the computer 1702, including hardware or software components, can interface with each other or the interface 1704 (or a combination of both) over the system bus 1703. Interfaces can use an application programming interface (API) 1712, a service layer 1713, or a combination of the API 1712 and service layer 1713. The API 1712 can include specifications for routines, data structures, and object classes. The API 1712 can be either computer-language independent or dependent. The API 1712 can refer to a complete interface, a single function, or a set of APIs.

The service layer 1713 can provide software services to the computer 1702 and other components (whether illustrated or not) that are communicably coupled to the computer 1702. The functionality of the computer 1702 can be accessible for all service consumers using this service layer. Software services, such as those provided by the service layer 1713, can provide reusable, defined functionalities through a defined interface. For example, the interface can be software written in JAVA, C++, or a language providing data in extensible markup language (XML) format. While illustrated as an integrated component of the computer 1702, in alternative implementations, the API 1712 or the service layer 1713 can be stand-alone components in relation to other components of the computer 1702 and other components communicably coupled to the computer 1702. Moreover, any or all parts of the API 1712 or the service layer 1713 can be implemented as child or sub-modules of another software module, enterprise application, or hardware module without departing from the scope of the present disclosure.

The computer 1702 includes an interface 1704. Although illustrated as a single interface 1704 in FIG. 17, two or more interfaces 1704 can be used according to particular needs, desires, or particular implementations of the computer 1702 and the described functionality. The interface 1704 can be used by the computer 1702 for communicating with other systems that are connected to the network 1730 (whether illustrated or not) in a distributed environment. Generally, the interface 1704 can include, or be implemented using, logic encoded in software or hardware (or a combination of software and hardware) operable to communicate with the network 1730. More specifically, the interface 1704 can include software supporting one or more communication protocols associated with communications. As such, the network 1730 or the interface's hardware can be operable to communicate physical signals within and outside of the illustrated computer 1702.

The computer 1702 includes a processor 1705. Although illustrated as a single processor 1705 in FIG. 17, two or more processors 1705 can be used according to particular needs, desires, or particular implementations of the computer 1702 and the described functionality. Generally, the processor 1705 can execute instructions and can manipulate data to perform the operations of the computer 1702, including operations using algorithms, methods, functions, processes, flows, and procedures as described in the present disclosure.

The computer 1702 also includes a database 1706 that can hold data for the computer 1702 and other components connected to the network 1730 (whether illustrated or not). For example, database 1706 can be an in-memory, conventional, or a database storing data consistent with the present disclosure. In some implementations, database 1706 can be a combination of two or more different database types (for example, hybrid in-memory and conventional databases) according to particular needs, desires, or particular implementations of the computer 1702 and the described functionality. Although illustrated as a single database 1706 in FIG. 17, two or more databases (of the same, different, or combination of types) can be used according to particular needs, desires, or particular implementations of the computer 1702 and the described functionality. While database 1706 is illustrated as an internal component of the computer 1702, in alternative implementations, database 1706 can be external to the computer 1702.

The computer 1702 also includes a memory 1707 that can hold data for the computer 1702 or a combination of components connected to the network 1730 (whether illustrated or not). Memory 1707 can store any data consistent with the present disclosure. In some implementations, memory 1707 can be a combination of two or more different types of memory (for example, a combination of semiconductor and magnetic storage) according to particular needs, desires, or particular implementations of the computer 1702 and the described functionality. Although illustrated as a single memory 1707 in FIG. 17, two or more memories 1707 (of the same, different, or combination of types) can be used according to particular needs, desires, or particular implementations of the computer 1702 and the described functionality. While memory 1707 is illustrated as an internal component of the computer 1702, in alternative implementations, memory 1707 can be external to the computer 1702.

The application 1708 can be an algorithmic software engine providing functionality according to particular needs, desires, or particular implementations of the computer 1702 and the described functionality. For example, application 1708 can serve as one or more components, modules, or applications. Further, although illustrated as a single application 1708, the application 1708 can be implemented as multiple applications 1708 on the computer 1702. In addition, although illustrated as internal to the computer 1702, in alternative implementations, the application 1708 can be external to the computer 1702.

The computer 1702 can also include a power supply 1714. The power supply 1714 can include a rechargeable or non-rechargeable battery that can be configured to be either user- or non-user-replaceable. In some implementations, the power supply 1714 can include power-conversion and management circuits, including recharging, standby, and power management functionalities. In some implementations, the power-supply 1714 can include a power plug to allow the computer 1702 to be plugged into a wall socket or a power source to, for example, power the computer 1702 or recharge a rechargeable battery.

There can be any number of computers 1702 associated with, or external to, a computer system containing computer 1702, with each computer 1702 communicating over network 1730. Further, the terms "client," "user," and other appropriate terminology can be used interchangeably, as appropriate, without departing from the scope of the present disclosure. Moreover, the present disclosure contemplates that many users can use one computer 1702 and one user can use multiple computers 1702.

Described implementations of the subject matter can include one or more features, alone or in combination.

For example, in a first implementation, a computer-implemented method includes the following. Drilling acoustic signals are received in real time during a drilling operation through rock at a drilling location. Transformed data is generated in a frequency domain from the drilling acoustic signals. The transformed data includes frequency and amplitude information for the drilling acoustic signals. De-noised transformed data is generated from the transformed data by filtering noise including background noise generated in a recording system and top drive rotation generated traces. A lithological significant frequency range that includes de-noised significant data points is determined from the de-noised transformed data. Physical properties of the rock are determined in real time using drill bit rotation rates and the amplitudes of the de-noised significant data points.

The foregoing and other described implementations can each, optionally, include one or more of the following features:

A first feature, combinable with any of the following features, the method further including digitizing, by a data acquisition unit, the drilling acoustic signals, where the drilling acoustic signals include one or more of: drill sounds obtained by one or more acoustic sensors attached directly to a drive shaft or to an extension of the drive shaft of a drill rig on surface; and drill sounds obtained by a downhole subassembly adjacent to a drill bit.

A second feature, combinable with any of the previous or following features, where generating the transformed data includes using a Fast Fourier Transformation (FFT) to transform the drilling acoustic signals into the transformed data.

A third feature, combinable with any of the previous or following features, where determining the physical properties of the rock includes: executing models to process the amplitudes of the de-noised significant data points; and accounting for the drill bit rotation rate.

A fourth feature, combinable with any of the previous or following features, where accounting for the drill bit rotation rate includes accounting for a top drive rotation rate and a mud motor rotation rate.

A fifth feature, combinable with any of the previous or following features, where accounting for the drill bit rotation rate includes minimizing the effect of the drill bit rotation rate by normalizing the amplitudes of the de-noised significant data points by the drill bit rotation rate.

A sixth feature, combinable with any of the previous or following features, where the models include a lithology type evaluation model and a physical property evaluation model.

A seventh feature, combinable with any of the previous or following features, the models are direct models and are constructed from lithology physical properties, de-noised amplitudes of the de-noised significant data points, and the drill bit rotation rate.

An eighth feature, combinable with any of the previous or following features, where the models are indirect models and are constructed from lithology physical properties, normalized amplitudes of the de-noised significant data points normalized by the drill bit rotation rate.

A ninth feature, combinable with any of the previous or following features, where determining the lithological significant frequency range of the de-noised significant data points includes omitting signals above a threshold frequency.

A tenth feature, combinable with any of the previous or following features, where the physical properties include porosity, water saturation, permeability, a presence of fractures, a lithology type, and a presence of hydrocarbons.

In a second implementation, a non-transitory, computer-readable medium stores one or more instructions executable by a computer system to perform operations including the following. Drilling acoustic signals are received in real time during a drilling operation through rock at a drilling location. Transformed data is generated in a frequency domain from the drilling acoustic signals. The transformed data includes frequency and amplitude information for the drilling acoustic signals. De-noised transformed data is generated from the transformed data by filtering noise including background noise generated in a recording system and top drive rotation generated traces. A lithological significant frequency range that includes de-noised significant data points is determined from the de-noised transformed data. Physical properties of the rock are determined in real time using drill bit rotation rates and the amplitudes of the de-noised significant data points.

The foregoing and other described implementations can each, optionally, include one or more of the following features:

A first feature, combinable with any of the following features, the operations further including digitizing, by a data acquisition unit, the drilling acoustic signals, where the drilling acoustic signals include one or more of: drill sounds obtained by one or more acoustic sensors attached directly to a drive shaft or to an extension of the drive shaft of a drill rig on surface; and drill sounds obtained by a downhole subassembly adjacent to a drill bit.

A second feature, combinable with any of the previous or following features, where generating the transformed data includes using a Fast Fourier Transformation (FFT) to transform the drilling acoustic signals into the transformed data.

A third feature, combinable with any of the previous or following features, where determining the physical properties of the rock includes: executing models to process the amplitudes of the de-noised significant data points; and accounting for the drill bit rotation rate.

A fourth feature, combinable with any of the previous or following features, where accounting for the drill bit rotation rate includes accounting for a top drive rotation rate and a mud motor rotation rate.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Drilling acoustic signals are received in real time during a drilling operation through rock at a drilling location. Transformed data is generated in a frequency domain from the drilling acoustic signals. The transformed data includes frequency and amplitude information for the drilling acoustic signals. De-noised transformed data is generated from the transformed data by filtering noise including background noise generated in a recording system and top drive rotation generated traces. A lithological significant frequency range that includes de-noised significant data points is determined from the de-noised transformed data. Physical properties of the rock are determined in real time using drill bit rotation rates and the amplitudes of the de-noised significant data points.

The foregoing and other described implementations can each, optionally, include one or more of the following features:

A first feature, combinable with any of the following features, the operations further including digitizing, by a data acquisition unit, the drilling acoustic signals, where the drilling acoustic signals include one or more of: drill sounds obtained by one or more acoustic sensors attached directly to a drive shaft or to an extension of the drive shaft of a drill rig on surface; and drill sounds obtained by a downhole subassembly adjacent to a drill bit.

A second feature, combinable with any of the previous or following features, where generating the transformed data includes using a Fast Fourier Transformation (FFT) to transform the drilling acoustic signals into the transformed data.

A third feature, combinable with any of the previous or following features, where determining the physical properties of the rock includes: executing models to process the amplitudes of the de-noised significant data points; and accounting for the drill bit rotation rate.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    detecting, using one or more first acoustic sensor, top drive rotation generated traces of top drive rotation sounds generated by a drill rig on surface, wherein the one or more first acoustic sensor is attached directly to a drive shaft or to an extension of the drive shaft of the drill rig on surface;
    detecting, using one or more second acoustic sensor, drill sounds, wherein the one or more second acoustic sensor is positioned in a downhole subassembly adjacent to a drill bit at a drilling location;
    receiving, in real time, drilling acoustic signals during a drilling operation through rock at the drilling location, wherein the drilling acoustic signals are based at least on the drill sounds detected by the one or more first acoustic sensor and the drill sounds detected by the one or more second acoustic sensor;
    generating, in a frequency domain, transformed data from the drilling acoustic signals, the transformed data including frequency and amplitude information for the drilling acoustic signals;
    tuning a sample-specific dynamic filter based on the detected top drive rotation generated traces of top drive rotation sounds generated by a drill rig on surface;
    generating de-noised transformed data from the transformed data by applying the tuned sample-specific dynamic filter to the transformed data to remove the detected top drive rotation generated traces of top drive rotation sounds generated by a drill rig on surface from the transformed data;
    determining, from the de-noised transformed data, a lithological significant frequency range;
    determining, from the de-noised transformed data and based on the determined lithological significant frequency range, a plurality of de-noised significant data points; and
    determining, in real time, physical properties of the rock using drill bit rotation rates and amplitudes of the determined plurality of de-noised significant data points.

2. The computer-implemented method of claim 1, further comprising digitizing, by a data acquisition unit, the drilling acoustic signals, wherein the drilling acoustic signals include one or more of:
    drill sounds obtained by one or more acoustic sensors attached directly to a drive shaft or to an extension of the drive shaft of a drill rig on surface; and
    drill sounds obtained by a downhole subassembly adjacent to a drill bit.

3. The computer-implemented method of claim 1, wherein generating the transformed data includes using a Fast Fourier Transformation (FFT) to transform the drilling acoustic signals into the transformed data.

4. The computer-implemented method of claim 1, wherein determining the physical properties of the rock includes:
   executing models to process amplitudes of the plurality of de-noised significant data points; and
   accounting for drill bit rotation rate.

5. The computer-implemented method of claim 4, wherein accounting for the drill bit rotation rate includes accounting for a top drive rotation rate and a mud motor rotation rate.

6. The computer-implemented method of claim 4, wherein accounting for the drill bit rotation rate includes minimizing an effect of the drill bit rotation rate by normalizing amplitudes of the plurality of de-noised significant data points by the drill bit rotation rate.

7. The computer-implemented method of claim 4, wherein the models include a lithology type evaluation model and a physical property evaluation model.

8. The computer-implemented method of claim 4, wherein the models are direct models and are constructed from lithology physical properties, de-noised amplitudes of the plurality of de-noised significant data points, and the drill bit rotation rate.

9. The computer-implemented method of claim 4, wherein the models are indirect models and are constructed from lithology physical properties, normalized amplitudes of the plurality of de-noised significant data points normalized by the drill bit rotation rate.

10. The computer-implemented method of claim 1, wherein the physical properties include porosity, water saturation, permeability, a presence of fractures, a lithology type, and a presence of hydrocarbons.

11. A non-transitory, computer-readable medium storing one or more instructions executable by a computer system to perform operations comprising:
   detecting, using one or more first acoustic sensor, top drive rotation generated traces of top drive rotation sounds generated by a drill rig on surface, wherein the one or more first acoustic sensor is attached directly to a drive shaft or to an extension of the drive shaft of the drill rig on surface;
   detecting, using one or more second acoustic sensor, drill sounds, wherein the one or more second acoustic sensor is positioned in a downhole subassembly adjacent to a drill bit at a drilling location;
   receiving, in real time, drilling acoustic signals during a drilling operation through rock at the drilling location, wherein the drilling acoustic signals are based at least on the drill sounds detected by the one or more first acoustic sensor and the drill sounds detected by the one or more second acoustic sensor;
   generating, in a frequency domain, transformed data from the drilling acoustic signals, the transformed data including frequency and amplitude information for the drilling acoustic signals;
   tuning a sample-specific dynamic filter based on the detected top drive rotation generated traces of top drive rotation sounds generated by a drill rig on surface;
   generating de-noised transformed data from the transformed data by applying the tuned sample-specific dynamic filter to the transformed data to remove the detected top drive rotation generated traces of top drive rotation sounds generated by a drill rig on surface from the transformed data;
   determining, from the de-noised transformed data, a lithological significant frequency range;
   determining, from the de-noised transformed data and based on the determined lithological significant frequency range, a plurality of de-noised significant data points; and
   determining, in real time, physical properties of the rock using drill bit rotation rates and amplitudes of the determined plurality of de-noised significant data points.

12. The non-transitory, computer-readable medium of claim 11, the operations further comprising digitizing, by a data acquisition unit, the drilling acoustic signals, wherein the drilling acoustic signals include one or more of:
   drill sounds obtained by one or more acoustic sensors attached directly to a drive shaft or to an extension of the drive shaft of a drill rig on surface; and
   drill sounds obtained by a downhole subassembly adjacent to a drill bit.

13. The non-transitory, computer-readable medium of claim 11, wherein generating the transformed data includes using a Fast Fourier Transformation (FFT) to transform the drilling acoustic signals into the transformed data.

14. The non-transitory, computer-readable medium of claim 11, wherein determining the physical properties of the rock includes:
   executing models to process the amplitudes of the plurality of de-noised significant data points; and
   accounting for drill bit rotation rate.

15. The non-transitory, computer-readable medium of claim 14, wherein accounting for the drill bit rotation rate includes accounting for a top drive rotation rate and a mud motor rotation rate.

16. A computer-implemented system, comprising:
   one or more processors; and
   a non-transitory computer-readable storage medium coupled to the one or more processors and storing programming instructions for execution by the one or more processors, the programming instructions instructing the one or more processors to perform operations comprising:
      detecting, using one or more first acoustic sensor, top drive rotation generated traces of top drive rotation sounds generated by a drill rig on surface, wherein the one or more first acoustic sensor is attached directly to a drive shaft or to an extension of the drive shaft of the drill rig on surface;
      detecting, using one or more second acoustic sensor, drill sounds, wherein the one or more second acoustic sensor is positioned in a downhole subassembly adjacent to a drill bit at a drilling location;
      receiving, in real time, drilling acoustic signals during a drilling operation through rock at the drilling location, wherein the drilling acoustic signals are based at least on the drill sounds detected by the one or more first acoustic sensor and the drill sounds detected by the one or more second acoustic sensor;
      generating, in a frequency domain, transformed data from the drilling acoustic signals, the transformed data including frequency and amplitude information for the drilling acoustic signals;

tuning a sample-specific dynamic filter based on the detected top drive rotation generated traces of top drive rotation sounds generated by a drill rig on surface;

generating de-noised transformed data from the transformed data by applying the tuned sample-specific dynamic filter to the transformed data to remove the detected top drive rotation generated traces of top drive rotation sounds generated by a drill rig on surface from the transformed data;

determining, from the de-noised transformed data, a lithological significant frequency range;

determining, from the de-noised transformed data and based on the determined lithological significant frequency range, a plurality of de-noised significant data points; and determining, in real time, physical properties of the rock using drill bit rotation rates and amplitudes of the determined plurality of de-noised significant data points.

17. The computer-implemented system of claim 16, the operations further comprising digitizing, by a data acquisition unit, the drilling acoustic signals, wherein the drilling acoustic signals include one or more of:

drill sounds obtained by one or more acoustic sensors attached directly to a drive shaft or to an extension of the drive shaft of a drill rig on surface; and drill sounds obtained by a downhole subassembly adjacent to a drill bit.

18. The computer-implemented system of claim 16, wherein generating the transformed data includes using a Fast Fourier Transformation (FFT) to transform the drilling acoustic signals into the transformed data.

19. The computer-implemented system of claim 16, wherein determining the physical properties of the rock includes:

executing models to process the amplitudes of the plurality of de-noised significant data points; and accounting for drill bit rotation rate.

* * * * *